United States Patent
Maiyuran et al.

(10) Patent No.: US 10,297,001 B2
(45) Date of Patent: May 21, 2019

(54) REDUCED POWER IMPLEMENTATION OF COMPUTER INSTRUCTIONS

(71) Applicants: Subramaniam Maiyuran, Gold River, CA (US); Shubh B. Shah, Folsom, CA (US); Ashutosh Garg, Folsom, CA (US); Jin Xu, El Dorado Hills, CA (US); Thomas A. Piazza, Granite Bay, CA (US); Jorge F. Garcia Pabon, Folsom, CA (US); Michael K. Dwyer, El Dorado Hills, CA (US)

(72) Inventors: Subramaniam Maiyuran, Gold River, CA (US); Shubh B. Shah, Folsom, CA (US); Ashutosh Garg, Folsom, CA (US); Jin Xu, El Dorado Hills, CA (US); Thomas A. Piazza, Granite Bay, CA (US); Jorge F. Garcia Pabon, Folsom, CA (US); Michael K. Dwyer, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,300

(22) Filed: Dec. 26, 2014

(65) Prior Publication Data
US 2016/0189327 A1    Jun. 30, 2016

(51) Int. Cl.
*G06T 1/20* (2006.01)
*G09G 5/00* (2006.01)
(Continued)

(52) U.S. Cl.
CPC .............. *G06T 1/20* (2013.01); *G06F 7/00* (2013.01); *G06F 9/3001* (2013.01);
(Continued)

(58) Field of Classification Search
CPC ...... G09G 2330/021; G06T 1/20; G06T 15/80
(Continued)

(56) References Cited

U.S. PATENT DOCUMENTS

2004/0186870 A1* 9/2004 Dhong ............... G06F 1/3203
708/620
2006/0149803 A1* 7/2006 Siu .................... G06F 9/30014
708/501

(Continued)

OTHER PUBLICATIONS

Seyfarth, Floating Point Instructions, Jun. 29, 2012, p. 1-18.*
(Continued)

*Primary Examiner* — Samantha (Yuehan) Wang
(74) *Attorney, Agent, or Firm* — Jordan IP Law, LLC

(57) ABSTRACT

Systems and methods may provide a graphics processor that may identify operating conditions under which certain floating point instructions may utilize power to fewer hardware resources compared to when the instructions are executing under other operating conditions. The operating conditions may be determined by examining operands used in a given instruction, including the relative magnitudes of the operands and whether the operands may be taken as equal to certain defined values. The floating point instructions may include instructions for an addition operation, a multiplication operation, a compare operation, and/or a fused multiply-add operation.

21 Claims, 16 Drawing Sheets

(51) Int. Cl.
  *G06T 15/80* (2011.01)
  *G09G 5/36* (2006.01)
  *G06F 7/00* (2006.01)
  *G06F 9/30* (2018.01)
(52) U.S. Cl.
  CPC ........ *G06F 9/3016* (2013.01); *G06F 9/30181* (2013.01); *G06T 15/80* (2013.01); *G09G 5/00* (2013.01); *G09G 5/363* (2013.01); G09G 5/001 (2013.01); G09G 2330/021 (2013.01); G09G 2360/08 (2013.01)
(58) Field of Classification Search
  USPC ........................................................ 345/522
  See application file for complete search history.

(56) References Cited

U.S. PATENT DOCUMENTS

| | | |
|---|---|---|
| 2006/0152519 A1 | 7/2006 | Hutchins et al. |
| 2007/0203967 A1 | 8/2007 | Dockser |
| 2009/0070607 A1* | 3/2009 | Safford ................. G06F 1/3234 713/320 |
| 2009/0150654 A1* | 6/2009 | Oberman ............ G06F 9/30014 712/221 |
| 2010/0017635 A1* | 1/2010 | Barowski .............. G06F 1/3203 713/322 |
| 2012/0019542 A1 | 1/2012 | Shah et al. |
| 2014/0122555 A1 | 5/2014 | Hickmann et al. |
| 2014/0143564 A1 | 5/2014 | Tannenbaum et al. |

OTHER PUBLICATIONS

International Search Report and Written Opinion for International Patent Application No. PCT/US2015/065676, dated May 19, 2016, 15 pages.
European Search Report for European Patent Application No. EP15874131.4, dated Jul. 4, 2018, 10 pages.

* cited by examiner

REDUCED POWER IMPLEMENTATION OF COMPUTER INSTRUCTIONS

BACKGROUND

As graphics logic increases in power use and capability, the graphics logic may be called upon to handle more demanding tasks, including some tasks that may have previously been handled by a system's Central Processing Unit (CPU). At the same time, power constraints, such as those in portable systems, may present challenges. Thus, graphics logic that uses available energy resources more efficiently may be desirable over graphics logic that uses available energy recourses less efficiently.

Moreover, graphics processors may provide a hardware implementation of assembly language instruction sets. The greater the complexity of the implementation, i.e., the greater the amount of hardware that is used in implementing a given instruction, the greater the amount of power that the implementation may use. Thus, in the aggregate over many uses, there may be an impact on overall power usage and energy efficiency of graphics logic and/or of a system including the graphics logic.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

There may be an increasing demand for energy efficient graphics logic that capably scales performance and/or watt of power consumed across various form factors (e.g., notebooks, gaming consoles, tablets, smartphones, etc.). One path to greater energy efficiency, i.e., lower power use, may be to provide hardware that may scale dynamically within a given form factor to meet an operating requirement of different workloads. Presented herein are embodiments that may dynamically alter power required in executing certain instructions based on a consideration of operands that the instructions may be called upon to process.

Figure 1:
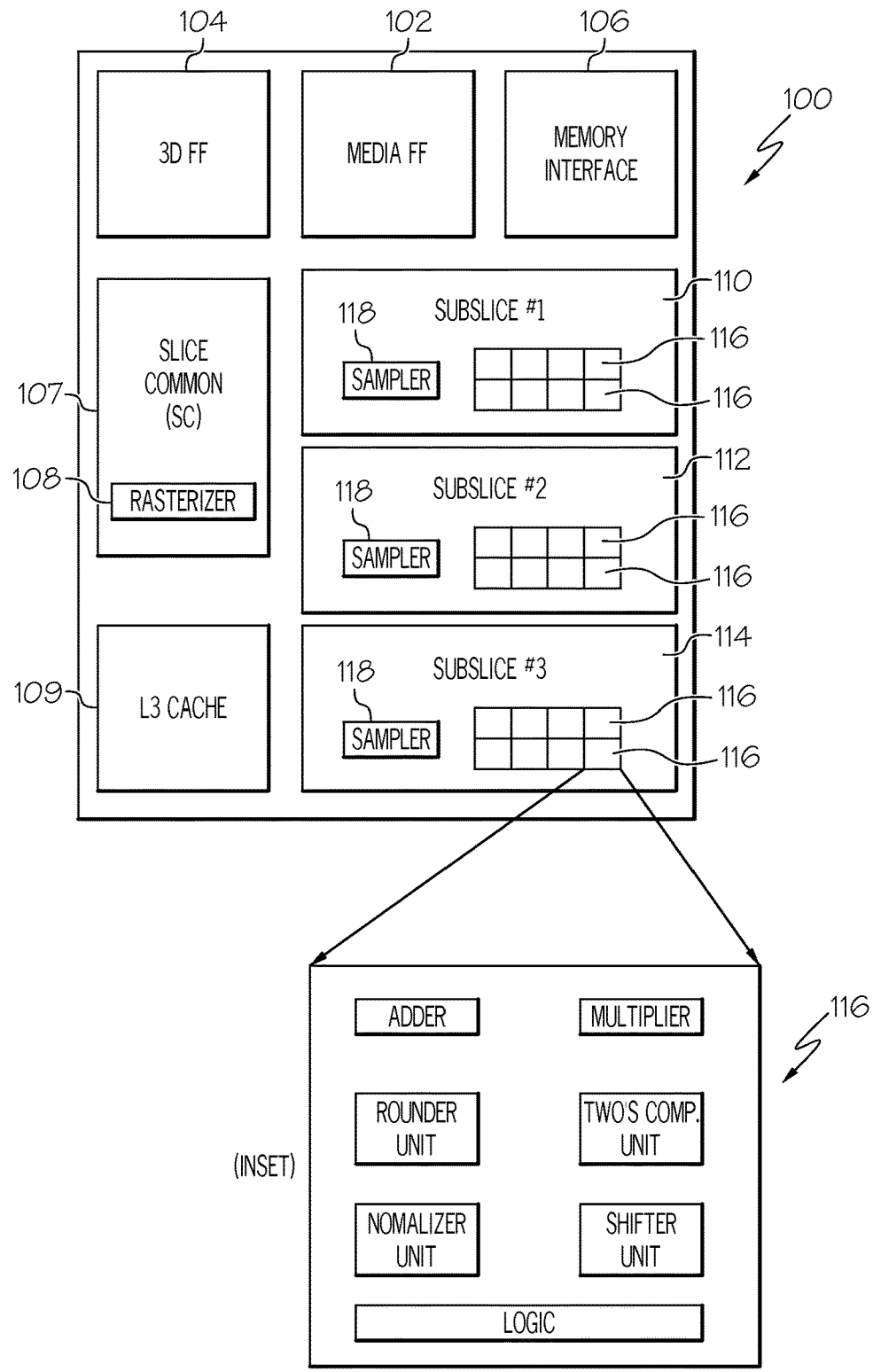
FIG. 1 is a block diagram of an example of a graphics processing architecture according to an embodiment.

FIG. 1 shows a bock diagram of an example of a graphics processing unit (GPU) 100 that may be used in examples of embodiments disclosed herein. The GPU 100 may include media fixed functions 102, three-dimensional (3D) graphics fixed functions 104, a memory interface 106, a slice common block 107 that may include a rasterizer 108, a level 3 (L3) cache 109, and three sub-slice blocks 110, 112, 114. Each of the sub-slice blocks 110, 112, 114 may have eight execution units (EUs) 116 and one sampler 118. As is further shown in the inset of FIG. 1, a given EU 116 may include a number of different hardware resources, including an adder, a multiplier, a rounder unit, a normalizer unit, a two's complement unit, a shifter unit, and a logic block. The foregoing is a non-exclusive list, and an EU may generally include other hardware resources as well, not shown in FIG. 1 for the sake of economy of illustration.

The EUs 116 may compute math and logic operations while the samplers may perform texture processing. There may be long kernels that are executed by one or more of the EUs 116 for some 3D workloads and/or for some media workloads, which may increase the utilization of the EUs in a context. In some embodiments, one or more of the EUs 116 may be capable of executing Institute of Electrical and Electronics Engineers (IEEE) compliant floating point instructions. In addition, the GPU 100 may be used to execute general purpose applications to allow load balancing between a central processing unit (CPU) and the GPU 100, which may place further emphasis on EU performance including with respect to power usage. In the illustrated embodiment, power savings provided in one or more of the EUs 116 may be leveraged eight-fold per sub-slice.

The instruction set with which one or more of the EUs 116 in the GPU 100 carries out a task may consist of fewer than approximately 100 (or so) individual instructions corresponding to various mathematical and/or logical operations. The implementation of an operation may be through its instruction, and the instruction may generally differ from one to another in their respective hardware implementation. For example, the Intel® Graphic Instruction Set (ISA) may utilize approximately 72 instructions. Of the instructions, certain instructions may be used more frequently than others. Thus, a repeated use of the instructions may have an outsized impact on power usage.

Four instructions that may be used more frequently than others, for example in a graphics processor, include an instruction to multiply floating point numbers (hereinafter referred to as MUL), an instruction to add floating point numbers (hereinafter referred to as ADD), an instruction to compare two floating point numbers (hereinafter referred to as CMP), and fused multiply-add instructions (hereinafter referred to an FMA) in which multiplication and then addition of floating point numbers are performed, with a single rounding occurring when the calculation is completed. With respect to a graphics processing unit (GPU), the four instructions may also be commonly used in shaders. Thus, power savings captured by hardware implementations of the four instructions may offer significant overall power savings.

Various standards have been promulgated for each of the four instructions MUL, ADD, CMP, and FMA. One widely accepted set of technical standards for the implementation of the four, and other, arithmetic instructions and/or operations is provided by the IEEE. For example, the IEEE has promulgated a set of standards for floating point arithmetic (IEEE Standard 754-2008—the IEEE Standard for Floating-Point Arithmetic), often referred to as the "IEEE 754 Standard," or just "IEEE 754". The IEEE 754 standard does not specify particular hardware, but instead focuses on various technical rules that may be applicable to a variety of hardware implementations. In general, IEEE 754 and similar standards provide designers with a measure of latitude in designing the hardware for a micro-architectural implementation of instructions. IEEE 754 and similar standards, however, may not necessarily define a micro-architecture of the implementation.

In example embodiments of a hardware implementation for MUL, ADD, CMP, and/or FMA instructions and/or operations, power-consuming hardware logic and/or circuitry that may be used to handle general cases may be disabled in commonly arising particular cases where such logic and/or circuitry may not be necessary to provide a correct result (i.e., an output) as defined by a given standard. The particular (i.e., specific) cases may be defined in terms of operands. In some embodiments, the given standard may be the IEEE 754-2008 standard. Embodiments discussed herein may, however, provide output that is also compliant with other standards. Thus, power may be saved by selectively powering off logic and/or circuits that may not be needed for a particular case and/or set of circumstances. Moreover, power may be saved by not providing power to certain logic and/or circuits except when the logic and/or circuits are used.

Hardware elements that may be employed in MUL, ADD, CMP, and/or FMA instructions and/or operations may vary with the instruction and/or implementation. Generally, the elements may include:
1. an adder to add numbers;
2. a multiplier to multiply floating point numbers;
3. a shifter unit to shift bits;
4. a normalizer unit to renormalize results and remove leading zeros;
5. a rounder unit to perform rounding operations; and/or
6. a two's complement unit to convert numbers from sign-magnitude format to two's complement format.

Any of the elements may be implemented in hardware in a variety of ways using hardware such as gates, flip-flops, counters, etc. Moreover, the elements may be implemented as part of an Arithmetic Logic Unit (ALU). A typical ALU may include one or more logic and/or circuits to handle addition, subtraction, magnitude comparison, and other operations. In some architectures, a separate Floating Point Unit (FPU) may be provided. In some hardware architectures, a multiplier may include an ALU.

Figure 2:
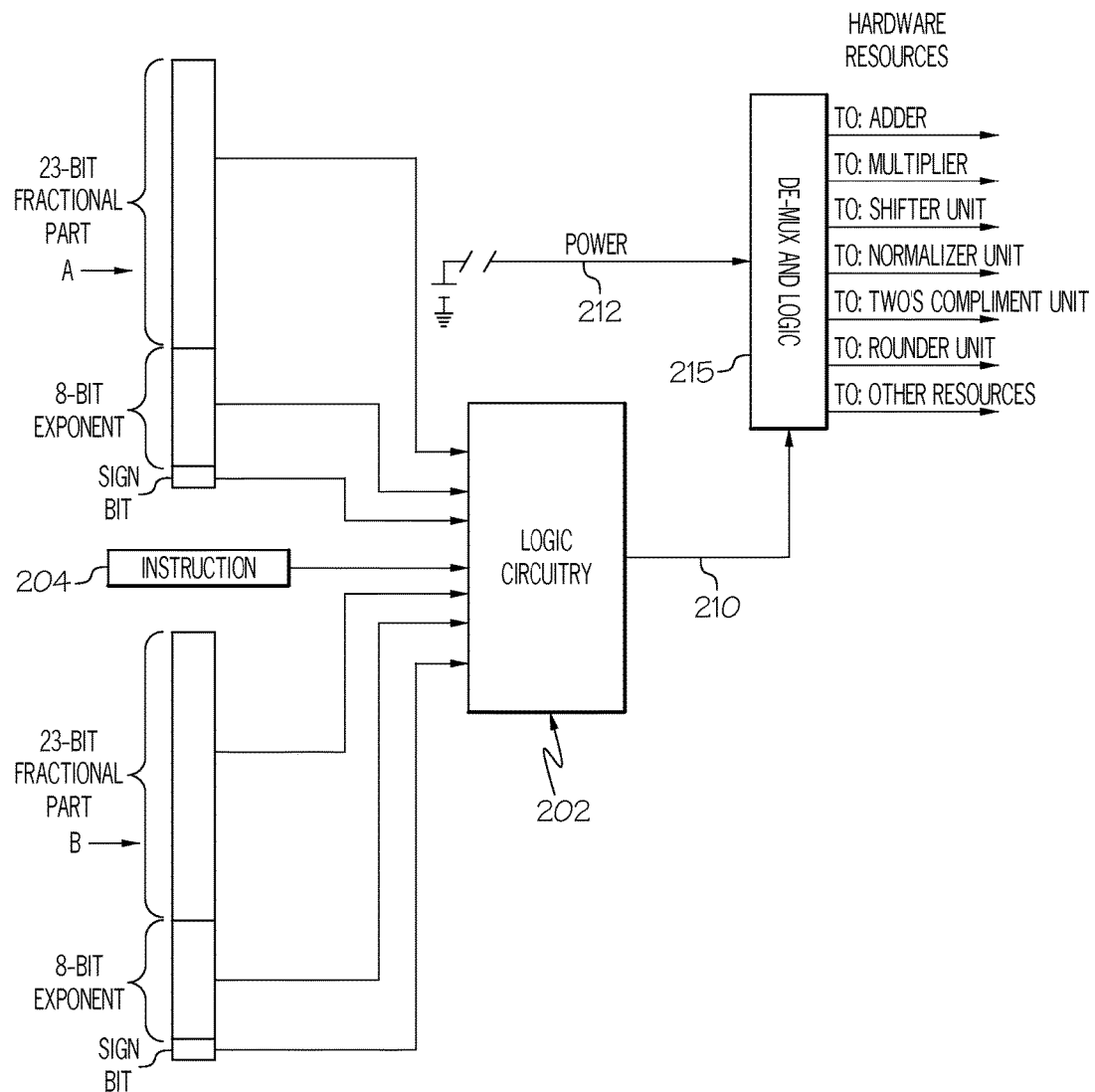
FIG. 2 is a block diagram of an example of a hardware arrangement to control a flow of power to one or more resources based on an operand characteristic according to an embodiment.

Turning now to FIG. 2, a block diagram of an example of a hardware arrangement is shown that may analyze an operating condition, such as operand characteristics, to determine hardware resources to be provided with power in executing a given instruction according to an embodiment. Floating point operands A and B each may have a 23-bit fractional part for their respective mantissas (a pre-appended 1 to the left of the binary point may be implicit), an 8-bit exponent, and a sign bit. Logic circuitry 202 may access each 23-bit fractional part, 8-bit exponent, sign bit, and instruction 204. In addition, the logic circuitry 202 may determine which hardware resources to use. The determination may generate a selection 210 that may be fed to a de-multiplexer unit 215, which may include further logic usable in determining which of various hardware resources are to be provided with power 212. In one example, the various hardware resources may include an adder, a multiplier, a shifter unit, a normalizer unit, a two's complement unit, a rounder unit, and/or various other resources.

A general case of a floating point multiplication may be expressed as follows:

$$A \cdot B = P$$

where operand A is a floating point multiplicand, operand B is a floating point multiplier, and P is a floating point product. In purely mathematical terms, a number of digits used to express a product may be equal to a sum of the digits in each operand. Embodiments that may save power usage in carrying out multiplication in a MUL instruction and/or operation may be based on operand-specific cases as follows:

1. Either A or B or both=0. In this case, we may take the product to be 0 without having to provide power to additional multiplication hardware typically used to execute multiplication, including a multiplier, a rounder unit, and/or a normalizer unit.

2. Either A or B or both are not-a-number (NaN). According to the IEEE 754 standard, NaNs may be indicated by setting an exponent to 11111111 in conjunction with a non-zero fraction. If either operand is a NaN, then an output of its multiplication may be designated as such, and an output may be indicated as such according to the IEEE 754 or similar standard without use of multiplication hardware.

3. Either A or B or both are an infinite number (INF), which may refer to a number that may be larger than may be represented in an architecture. INFs may be indicated in the IEEE 754 standard by using an all-0s fraction and an exponent of all 1s. In this case, the product may similarly be taken to be infinite and expressed accordingly without use of multiplication hardware.

4. One of the operands is 1. In this case, the product is simply the other operand, and use of the multiplication hardware may be avoided.

5. Either A or B or both are denormal. For a given floating-point system, let $E_{min}$ be the smallest exponent representable by the system. An operand whose magnitude is less than $1.0 \times 2^{E_{min}}$ may be referred to as "denormal." In some Application Programming Interfaces (APIs), denormal numbers are flushed to 0. For example, a DirectX® (Microsoft Corp.) API permits a denormal to be flushed to 0. In this case, multiplication by a denormal may be treated as multiplication by 0 and handled as in example case (1) above. In addition, since the treatment may be API-specific, denormals may not be flushed but instead may be further processed in subsequent arithmetic operations when, e.g., other APIs and/or other standards are to be utilized.

To recapitulate, multiplication of floating point numbers may make use of resources that need not be fully deployed in the foregoing cases. In these cases, embodiments disclosed herein may not provide power to the resources unless they are specifically needed.

Figure 3:
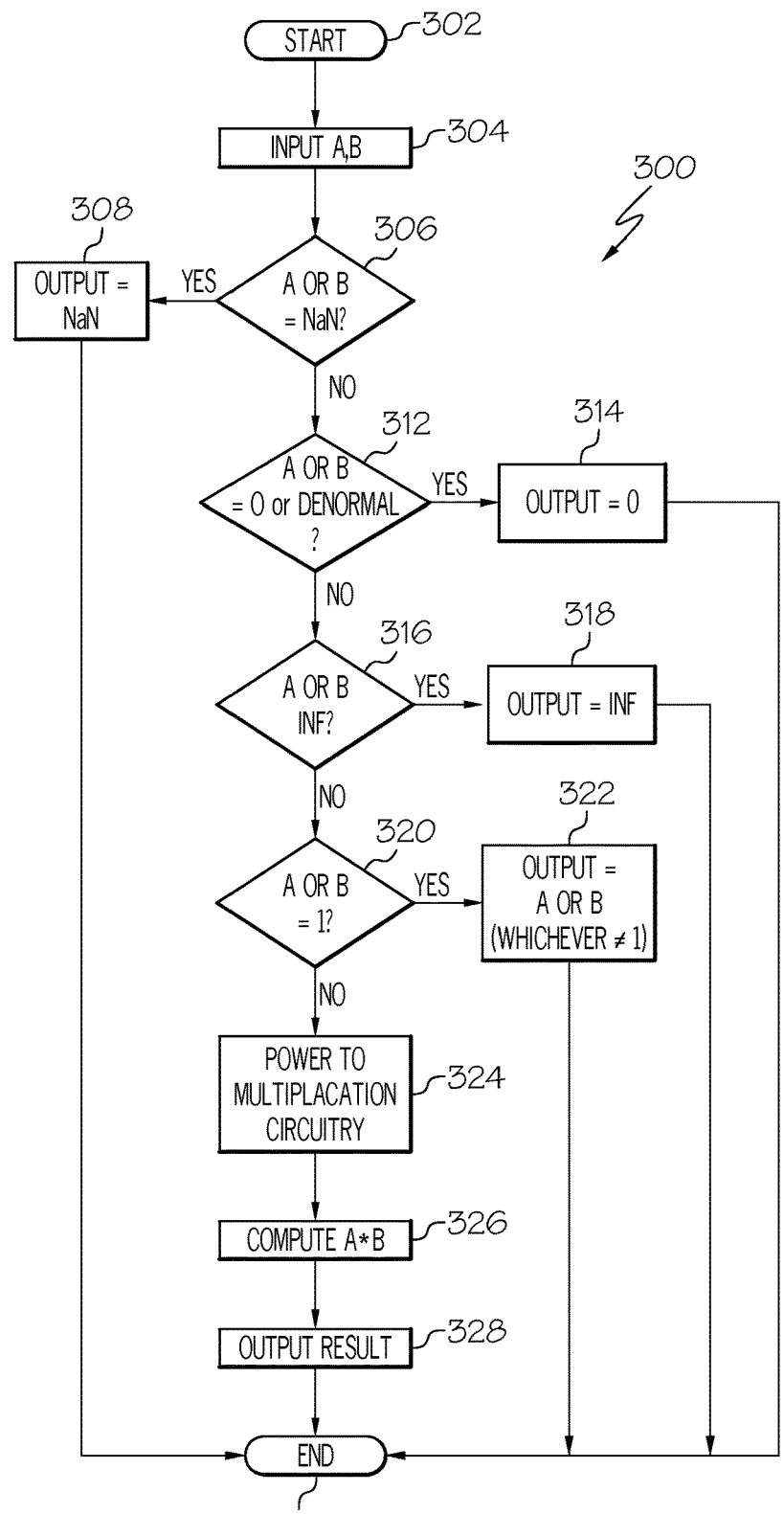
FIG. 3 is a flowchart of an example of a method of executing a multiplication instruction according to an embodiment.

FIG. 3 shows a flowchart of an example of a method 300 of handling particular cases in a floating point multiplication (MUL) instruction and/or operation according to an embodiment. The method 300 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 300 may be written in any combination of one or more programming languages, including an object oriented programming language such as C++ or the like and conventional procedural programming languages, such as the "C" programming language or similar programming languages. Moreover, the method 300 may be implemented using any of the herein mentioned circuit technologies.

At processing block 302, certain circuitry used to perform floating point multiplication may be gated off and/or otherwise not engaged so that the circuitry does not receive electrical power. The circuitry may include a multiplier, a Floating Point Unit (FLP), a normalizer unit, a rounder unit, and/or other hardware as may be used in a micro-architectural implementation of floating point multiplication.

Two operands, here indicated as A and B, may be considered at processing block 304. A determination may be made at block 306 whether either or both of the operands is a NaN. If so, then a product of the operands may be output at the processing block 308 as a NaN and the MUL instruction may be completed at processing block 310. If, however, neither A nor B is a NaN, then a determination may be made at block 312 whether either operand equals 0 or is denormal. If so, then an output may be set to 0 at processing block 314 and the execution of the MUL instruction may be completed at the processing block 310. If neither operand is denormal or equals 0, then a determination may be made at block 316 whether either operand A or B is an INF (infinite), as such may be defined for a given standard. If so, then an output may be set to INF at processing block 318, and the MUL instruction may be completed at the processing block 310. If neither operand is an INF, then a determination may be made at block 320 whether either operand equals 1, an identity element for multiplication. If so, then an output may be set to the value of whichever operand does not equal one, or, in the event both equal 1, the output may be set to 1 at the processing block 322, and the MUL instruction may be completed at the processing block 310.

It will be appreciated that the order of the preceding tests may be varied. For example, in other embodiments, a test for INF may precede a test for NaN, a 0 test may occur later than indicated, and so forth. In other embodiments, the tests may be conducted in parallel with one another.

If neither operand is equal to 1, then power may be provided to a multiplier and/or other circuitry at processing block 324, which may be used to perform floating point multiplication in the particular hardware implementation at hand. The product A*B may be computed at processing block 326, along with whichever form of rounding the architecture may employ via its rounder unit, and a result may be output at processing block 328. The execution of the MUL instruction may be completed at the processing block 310, and power to multiplication circuits (e.g., multiplier, rounder unit, and/or normalizer unit) may again be turned off. In the cases where such circuits may not need to be powered, there may be a net savings in energy consumption. In some embodiments, the power used to make determinations of the aforementioned cases may be only 1%-5% of multiplier power, depending on the specific hardware implementation employed.

Another instruction and/or operation, floating point addition (ADD), presents cases where power usage may be economized. A general case of a floating point addition may be expressed as follows:

$$A+B=S$$

where A and B are floating point operands that may also be referred to as summands, and S is a resulting sum. Embodiments that may economize power usage may be based on operand-specific cases as follows:

1. Either A or B or both equal 0. In this case, we may take a sum to be equal to the non-zero operand or, if both operands=0, then their sum=0. This rule may be used to determine a correct IEEE standard compliant sum without having to power additional hardware necessary to do floating point addition, such as an adder, a shifter unit, and/or a two's complement unit.

2. Either A or B or both are not-a-number (NaN). In this case, an output of the operation may be indicated as a NaN without having to provide power to an adder, a shifter unit, and/or a two's complement unit.

3. Either A or B or both are an infinite number (INF). In this case, a sum may be taken to be infinite and expressed accordingly without requiring an adder, a shifter unit, and/or a two's complement unit.

4. Either A or B or both are denormal. This case may be treated (where determined by a standard and/or an API in use) as though an operand were 0, bypassing an adder, a shifter, and/or a two's complement unit.

5. A and B differ too far in magnitude for both to be considered. When the numbers A and B are expressed in IEEE standard normalized form, an exponent of A may be greater than an exponent of B by some amount such that B may effectively be taken as 0 and then an output may be taken to be A. For example, let a fractional part of the mantissa occupy 23 bits of a 32-bit word with a pre-appended 1 implicit as per the IEEE 754 standard, the exponent take up an additional 8 bits and the $32^{nd}$ bit be the sign bit. If the exponent of A minus the exponent of B is greater than or equal to (>=) 25, B may be ignored (taken to equal 0) and an adder may be bypassed. Moreover, a difference between A and B may be so great that rounding may not be a consideration under round-to-nearest-even mode (RNE), and an answer may be A. This example may occur because once the numbers have been converted to two's complement form, the 24-bit number (including the leading implicit bit to the left of the binary point) may now be 25 bits long, with the $25^{th}$ bit representing the sign. A shift of the fractional parts of normalized numbers, such as may be used to provide them with a common exponent, may effectively place the smaller of the two numbers out of range for the purpose of the calculation, even under RNE rounding. If the exponent of A minus the exponent of B equals 24, an adder may be bypassed by the implementation, and depending on a rounding mode, an output may be A or A+1. Should the exponent of B equal 0, B may be taken to equal 0 in certain standards, in which case an adder and a shifter unit may be bypassed.

Figure 4:
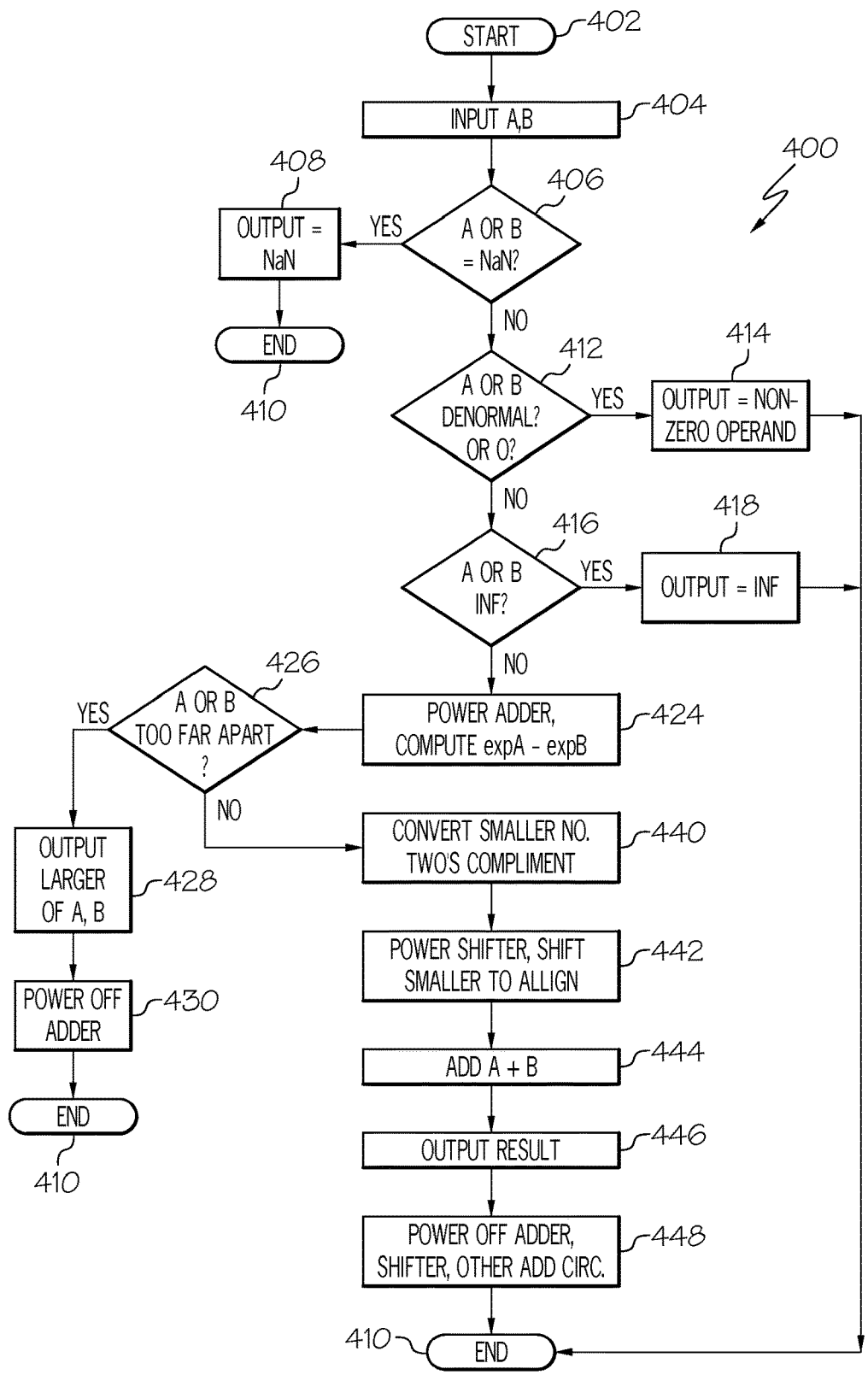
FIG. 4 is a flowchart of an example of a method of executing an addition instruction according to an embodiment.

Turning now to FIG. 4, a flowchart of an example of a method 400 of handling certain cases in floating point addition implemented through an ADD instruction is shown according to an embodiment. The method 400 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 400 may be written in any combination of one or more programming languages, including an object oriented programming language such as C++ or the like and conventional procedural programming languages, such as the "C" programming language or similar programming languages. Moreover, the method 400 may be implemented using any of the herein mentioned circuit technologies.

At processing block 402, certain circuitry often used to perform a floating point addition may be gated off and/or otherwise not engaged so that the circuitry does not receive any power. The gated off circuitry may include an adder, a shifter unit, a two's complement unit, or other hardware as may be used in a micro-architectural implementation of the ADD instruction.

Two floating point operands, here indicated as A and B, may be presented at processing block 404. A determination may be made at block 406 whether either of the operands is a NaN. If an operand is a NaN, an output may be indicated to be a NaN at processing block 408 and the execution of the ADD instruction may be completed at processing block 410. If, however, neither A nor B is a NaN, then a determination may be made at processing block 412 whether either operand equals 0 or may be effectively treated as such if a denormal and a standard used so permits. If so, then an output may be set to the non-zero operand at processing block 414 and the execution of the instruction may be completed at the processing block 410. If neither operand equals 0, then a determination may be made at block 416 whether either operand A or B is an INF (infinite), as this may be defined by a given architecture. If so, then an output may be set to INF at processing block 418, and execution of the ADD instruction may be completed at the processing block 410.

It will be appreciated that the order of the preceding tests may vary. For example, in other embodiments, a test for INF may precede a test for NaN, a 0 test may occur later than indicated, and so forth. In other embodiments, the tests may be conducted in parallel with one another.

If the operands are neither NaN, 0, denormal, nor INF, then power may be provided to an adder and to a two's complement unit, and a difference between exponents may be computed at processing block 424. The difference, herein indicated as expA−expB, may provide an indication of a number of binary orders of magnitude difference separating the two numbers A and B. A determination may be made at block 426 whether A and B are sufficiently far apart as to fall into case (5), discussed above. The determination may depend on a standard employed, including such considerations as a rounding protocol used, and a word length available for expressing floating point numbers. In a single precision embodiment as per the aforementioned IEEE 754 standard, a fractional part of the mantissa of a number may occupy 23 bits of a 32-bit word with a pre-appended 1 implicit, followed by an 8-bit exponent and a sign bit in the $32^{nd}$ bit position. If expA−expB>=25, B may be ignored (taken to equal 0) and neither an adder nor a rounding block may be needed when using a round-to-nearest-even mode (RNE). If expA−expB=24, an adder may be bypassed and in an architecture using RNE rounding, an output may be A or A+1, depending on particulars of a rounding operation.

Should the exponent of B equal 0, B may be taken to equal 0 in certain standards, in which case an adder may be bypassed.

Whichever protocol and/or standard employed, if the difference in magnitude between A and B is sufficiently great, discussed above, then the smaller of the two of the operands (e.g., B) may be taken to equal 0, and the larger of the operands (e.g., A) may be taken to be an output at processing block 428. Hardware components that may be needed for conventional floating point add operations, such as an adder and/or a two's complement unit, may be unpowered at processing block 430, and execution of the ADD instruction may be completed at the processing block 410. If, on the other hand, the operands A and B are not so far apart, discussed above, then the circuitry of a two's compliment unit may be given power at processing block 440, and the smaller number's mantissa may be converted to two's complement form. Shifter circuitry may be powered on at processing block 442, and the smaller operand may be brought into binary point alignment with the larger operand. Then, the adder may be used to compute a sum A+B at processing block 444, and a result may be provided as output at processing block 446. At this point, an adder, a shifter, a two's complement unit and/or related circuitry may no longer be used and may be powered off at processing block 448, and the ADD operation may be completed at the processing block 410.

A third instruction considered, CMP, may be used to perform a floating point compare operation. In one embodiment, CMP may determine whether two floating point numbers, referred to as A and B, are equal. In another embodiment, CMP more broadly may determine whether A=B, A>B, or B>A. In this embodiment, and consistent with the IEEE 754 standard, a floating point number may have three fields including a sign bit S, an 8-bit exponent field, and a 23-bit field for the fractional part of the mantissa and an implicit $24^{th}$ bit for the mantissa, discussed above. When presented in standardized form, there may be an implicit leading 1 to the left of the binary point and the 23-bit fractional part of the mantissa. If two numbers have a same sign bit, exponent, and mantissa, then the numbers will be equal in a given implementation. In a significant number of cases, however, it may not be necessary to test each of the three fields against one another to arrive at an answer.

According to one embodiment, if the signs of the two numbers A and B are different, then there may be no need to go through a full addition or subtraction to determine if one is greater than the other. Whichever number is positive may be greater than the number that is negative. If the signs are the same but one number has a larger exponent than the other, then the number with the larger exponent may be the larger of the two since the signs are the same and the numbers have been expressed in a standard form that does not entail shifting. Even if both the sign and exponents are equal for both numbers and addition operations are to be conducted on the mantissa part of each (at which point power is supplied to an adder), no shifter circuitry or multiplexers may be used since, to get to this point, the exponents and signs may be the same for both numbers. By using less hardware circuitry in this and other cases, less power may be consumed.

Figure 5:
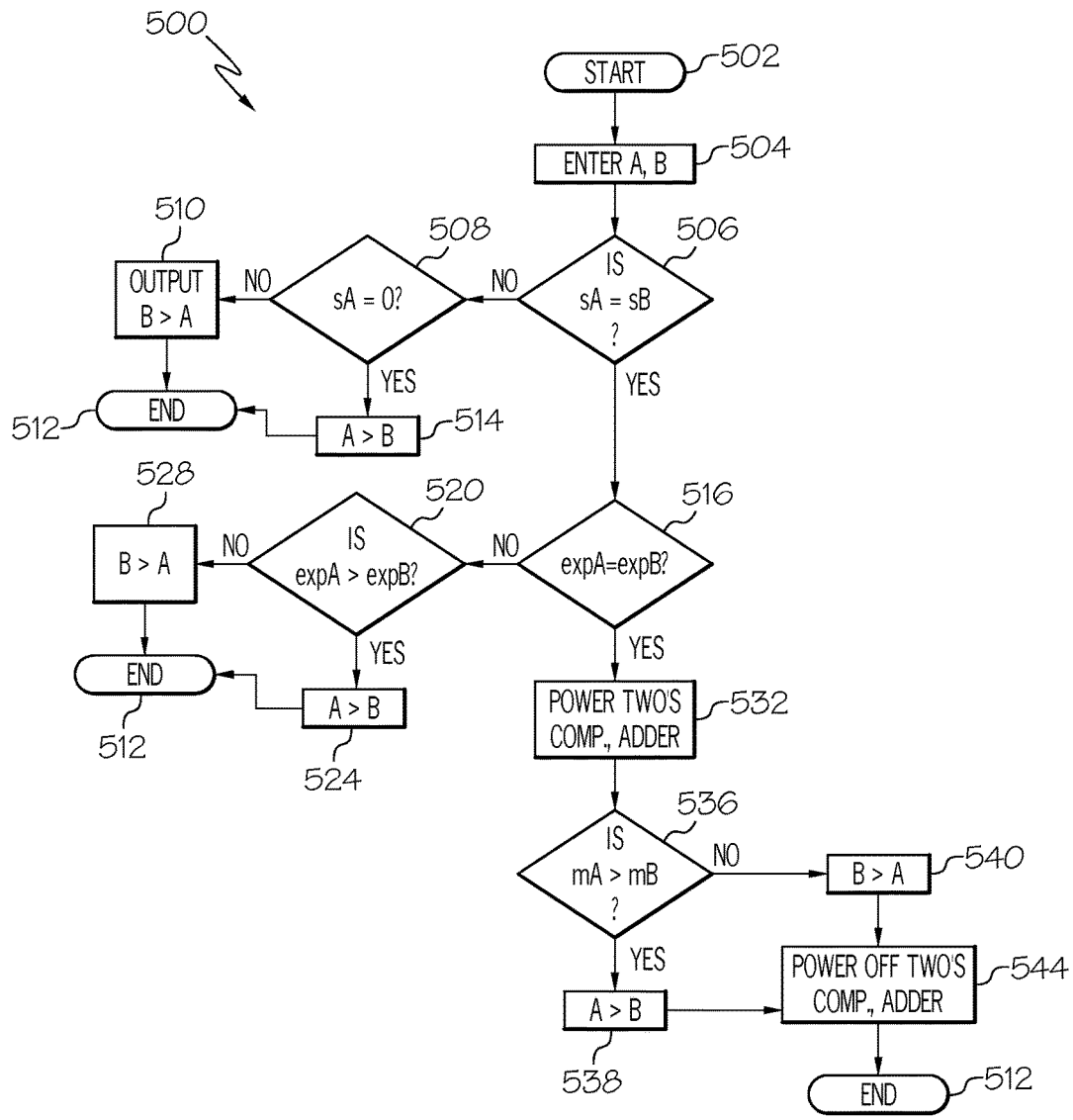
FIG. 5 is a flowchart of an example of a method of executing a compare instruction according to an embodiment.

FIG. 5 shows a flowchart of an example of a method 500 to determine whether two floating point numbers, referred to as A and B and that are each presented in a standard form as indicated above, are equal or if not equal, which is the greater according to an embodiment. The method 500 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 500 may be written in any combination of one or more programming languages, including an object oriented programming language such as C++ or the like and conventional procedural programming languages, such as the "C" programming language or similar programming languages. Moreover, the method 500 may be implemented using any of the herein mentioned circuit technologies.

Certain hardware may be gated off with respect to power at processing block 502. The hardware may include a two's complement unit, an adder, and/or a shifter unit. The numbers may be provided at processing block 504, including respective sign bits sA and sB, exponents expA and expB, and fractional mantissa parts mA and mB.

A determination may be made at block 506 whether the sign bits sA and sB are the same. One possible hardware implementation of the test may be to feed the bits sA and sB to an XNOR gate, which may return a logical 1 only if the bits sA and sB are the same value. Other hardware implementations may use other gates, such as XOR, NAND, AND, OR, and so on. If the sign bits sA and sB are not the same, then the numbers differ in sign. A test for the sign bit of A may be completed at block 508 to determine whether it is 0 and therefore positive (e.g., in an implementation where a 0 sign bit corresponds to a positive number). If the sign bit of A is not 0, then B may be positive and A may be taken to be negative, processing block 510 may determine that B>A, and the instruction may be completed at processing block 512. If the sign bit of A=0, then processing block 514 may determine that A>B and execution of the instruction may be completed at the processing block 512.

If the block 506 determines that the signs of A and B are the same, a determination may be made at block 516 whether exponent parts of the numbers A and B, expA and expB respectively, are equal. If not, a determination may be made at block 520 whether expA>expB. Calculation of a difference between the exponents expA and expB may be accomplished using an 8-bit subtractor, which is commonly available in chip architectures. If A has the larger exponent, then processing block 524 may determine that A>B. Otherwise, processing block 528 may determine that an output is B>A, and the instruction may be completed at the processing block 512. Note that the determinations may be made without the use of a two's complement unit, a shifter unit, and/or an adder, which may be powered off here.

Should the block 516 determine that the two numbers A and B have identical exponents, then a two's complement unit and/or an adder may be provided with power at processing block 532, and block 536 may test whether the mantissas mA and mB to determine whether the mantissa of A is greater than the mantissa of B. If so, then processing block 538 may determine that an output is A>B. Otherwise, processing block 540 may determine that an output is B>A. A two's complement unit and/or an adder may be powered off at processing block 544, and execution of the instruction may be completed at the processing block 512. In this embodiment, a shifter may not be used and/or may not have to be powered up to do a comparison, further saving power.

Another instruction, for which embodiments presented here may provide power savings, is fused multiply-add (FMA). The FMA instruction is a compound operation that may include a floating-point multiply followed by a floating point add operation that may be performed in one step, with a single rounding thereafter.

In one example, let A, C, and X be floating point numbers. Then, FMA computes:

$$C \cdot X + A = \text{Output}$$

We may further define a floating point variable $D = C \cdot X$, so that stated more compactly:

$$D + A = \text{Output}$$

The operation arises frequently enough that it may appear in instruction sets as an instruction. Embodiments presented here identify certain commonly occurring situations where the full hardware implementation of FMA may not be required. The following cases are may offer power savings in certain implementations according to embodiments:

1. Any of A, C, or X equals 0. If A=0, then an output will be CX. In this case, an adder may be gated off from a power supply, as use of it may not be made in computing the FMA output. If either C or X=0, then an output may be A, and both the multiplier and the adder may be gated off, as they need not be used to provide a correct FMA output.

2. Any of A, C or X are not-a-number (NaN). According to the IEEE 754 standard, NaNs may be indicated by setting an exponent to 11111111 along with a non-zero fraction. In this case, an FMA output similarly is not-a-number, and may be indicated as such according to a standard without needing to engage an adder and/or a multiplier.

3. Any of A, C or X is an infinite number (INF), for example referring to a number that may be larger than may be represented in an architecture. INFs may be indicated in the IEEE 754 standard by using an all-zeros fraction and an exponent of all 1 s. In this case, an FMA output may similarly be taken to be infinite and expressed accordingly without requiring a multiplier and/or an adder.

4. C or X=1. In this case, a product is simply the other operand, and multiplication hardware may be bypassed.

5. Any of A, C or X are denormal. Depending on a standard and/or an API used, the case may be treated as though the number were 0, or it may be treated as a small number for which further calculation may be required. In the IEEE 754 standard and under some APIs, it may be treated as a 0. In some standards, a normalized number having an exponent of −127 may be taken to equal 0. Thus, if the exponent of A is −127, then an output would be D, wherein computation of which may make use of a multiplier and/or a rounder unit, and wherein an adder may be bypassed. In the case of D having an exponent of −127, then in some embodiments the output may be A, and neither an adder, a multiplier, nor a rounder unit may be used.

6. When expressed in normalized form, binary points (radixes) may be so far apart such that A may be sufficiently greater than C·X and that the output may be taken as A. This case may not require the use a multiplier circuitry, an adder circuitry, or a shifter circuitry. In some circumstances (depending on a standard and/or an API) rounder circuitry may also be dispensed with.

Figure 6:
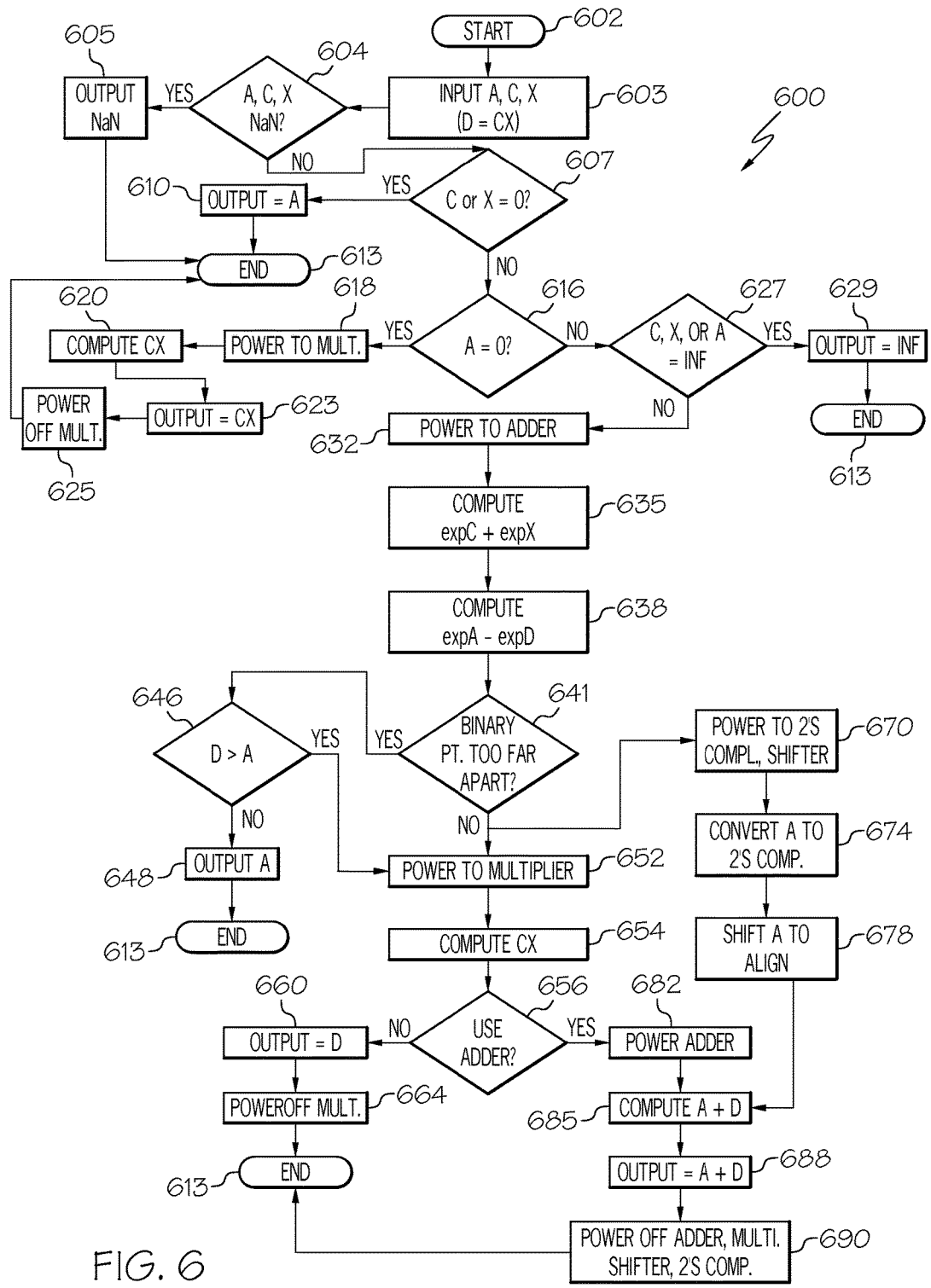
FIG. 6 is a flowchart of an example of a method of executing a fused multiply-add instruction according to an embodiment.

Turning now to FIG. 6, a flowchart of an example of a method 600 to compute correct output of an FMA instruction is shown according to an embodiment. The method 600 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 600 may be written in any combination of one or more programming languages, including an object oriented programming language such as C++ or the like and conventional procedural programming languages, such as the "C" programming language or similar programming languages. Moreover, the method 600 may be implemented using any of the herein mentioned circuit technologies.

Selected hardware circuitry may be gated off so that the circuitry is not powered at processing block 602. Hardware circuits may include an adder, a multiplier, a shifter unit, and/or a two's complement unit. Floating point numbers A, C and X may be presented at processing block 603. In the illustrated example, the numbers A, B, and X may be in an IEEE-standardized form, having a sign bit, an 8-bit exponent, and a 23-bit fractional mantissa having an implicit leading bit to the left of the binary point. In other embodiments, longer or shorter representations of numbers may be used, including double precision depictions of numbers.

A determination may be made at block 604 whether any of the numbers A, C, or X are not-a-number (NaN) under a standard used. If A, C, or X is a NaN, then an output of a NaN may be given at processing block 605 and the instruction may be completed at processing block 613.

If no operands (e.g., numbers A, C, or X) are a NaN, then a determination may be made at block 607 whether C or X is 0. If either C or X is 0, then an output may be set to A at processing block 610, which is a correct FMA output for this case. It is noted that this output may be obtained without making use of an adder, a multiplier, a shifter unit, and/or a two's complement unit, thereby saving on power since they may be powered off. If neither C nor X equals 0, then a determination may be made at block 616 whether A equals 0. If so, then power may be provided to a multiplier and/or a multiplication circuitry at processing block 618 and a product C·X may be computed at processing block 620, which may be provided as an output at processing block 623. Power to a multiplier and/or a multiplication circuitry may be again gated off at processing block 625, and execution of the FMA instruction may be completed at the processing block 613. The preceding tests for 0 may also subsume one or more tests for numbers that are denormal, since such numbers may be treated as if equal to zero in various standards and/or APIs.

If, on the other hand, it is determined at the block 616 that A does not equal 0, then a determination may be made at block 627 whether the numbers C, X, or A are infinite (INF), as per an arithmetic standard employed. If so, then an output at processing block 629 may be INF and the instruction may be completed at the processing block 613.

It will be appreciated that the order of the preceding tests may vary. For example, in other embodiments, a test for INF may precede a test for NaN, a test for 0 may occur after a test for INF, and so forth. In other embodiments, the tests may be conducted in parallel with one another.

If none of the operands is infinite, 0, or a NaN, then power may be provided to the circuitry of an adder at processing block 632. Exponents of C and of X may be summed together at processing block 635, which may provide a measure of magnitude of a size of a product D=C·X. A magnitude of the product D may be compared to the magnitude of A by computing a difference between the exponents of A and of D at processing block 638.

Processing block 641 may discern several cases where the respective binary points of A and D may be so far apart to warrant certain simplifying calculations to be made in determining an FMA output. For notational compactness, the exponent part of a given number is referenced as expN, so that the exponent part of A is expA, the exponent part of X is expX, the exponent of C is expC, and the exponent of D is expD (since expD=expX+expC).

Embodiments may consider all or some of the following cases:

1. expA−expD>=25. In this case, D may be taken to equal 0, and an output of an FMA instruction may be set to A without recourse to a multiplier, an adder, and/or a rounder unit.

2. expD−expA>=50. In this embodiment, floating point numbers A, C, and X may be 24-bits long including the implicit leading bit to the left of the binary point, so that the width of the product D=C·X may be 48 bits. Further, including bits for sign and to assist in overflow considerations, 50 bits may be considered in this embodiment. In this case, where expD−expA>=50, A may be taken to equal 0, and an output of the FMA instruction may be D without recourse to an adder. A multiplier and/or a rounder may be used in computing the product D and an output of an FMA instruction.

3. expA−expD=24. The output may be taken as equal to A or A+1, depending on rounding employed. An adder may be bypassed. In some embodiments, a multiplier and a rounder unit may be powered to enable computations for rounding of A.

4. expD−expA=50. In this case (where we may consider 50 bits for the product D), an output may be taken as equal to D or D+1, depending on rounding employed. An adder may be bypassed and a multiplier and a rounder unit may be used in the computation.

Returning to FIG. 6, several exemplary cases will be discussed from the block 641 forward. A determination may be made at the block 641 whether |expD−expA|>=50. If so, then a "yes" branch from the block 641 may be taken, and power may not be supplied to an adder, a rounder unit, and/or a multiplier. A determination may be made at block 646 whether D>A. If not, then a standard correct output of the FMA operation may be A, which may be an output at processing block 648. Power to an adder, a multiplier, and/or a rounder unit may not be used here, and the operation may be completed at the processing block 613.

On the other hand, if it is determined at the block 646 that D>A, then power may be provided to a multiplier at processing block 652 and, depending on the implementation, to a rounder unit as well to facilitate a computation of D at processing block 654 where D=C·X may be computed. A determination may be made at block 656 whether addition is to be carried out and in one embodiment, the determination may be based on operand conditions discussed above. In this case, addition may not be performed here because D may be so much greater than A and a "no" branch to processing block 660 may be taken, wherein an output may be taken to be D at the processing block 660. A multiplier may be powered off at processing block 664 (as is a rounder unit, if it has been used), and the FMA instruction may be completed at the processing block 613.

Power may be provided to a multiplier at the processing block 652 when the binary points are not too far apart, discussed above, and also to a two's complement unit and/or a shifter unit at processing block 670. D=C·X may be computed at the processing block 654, and a determination whether an adder is to be used here is made at the block 656. In the general case, an adder may be used to form the sum A+D, so that power to an adder may be provided at processing block 682 along with power to a rounder unit. Processing block 685 may compute a sum A+D, which may make use of results provided in processing block 674 that may convert A to a two's complement form, and processing block 678 that may shift A into correct alignment with D so that an adder may perform a sum in the processing block 685. An output may be set to A+D at processing block 688, and an adder, a shifter unit, a rounder unit, a multiplier, and/or a two's complement unit may be turned off at processing block 690 as the FMA instruction may be completed at the processing block 613.

Figure 7:
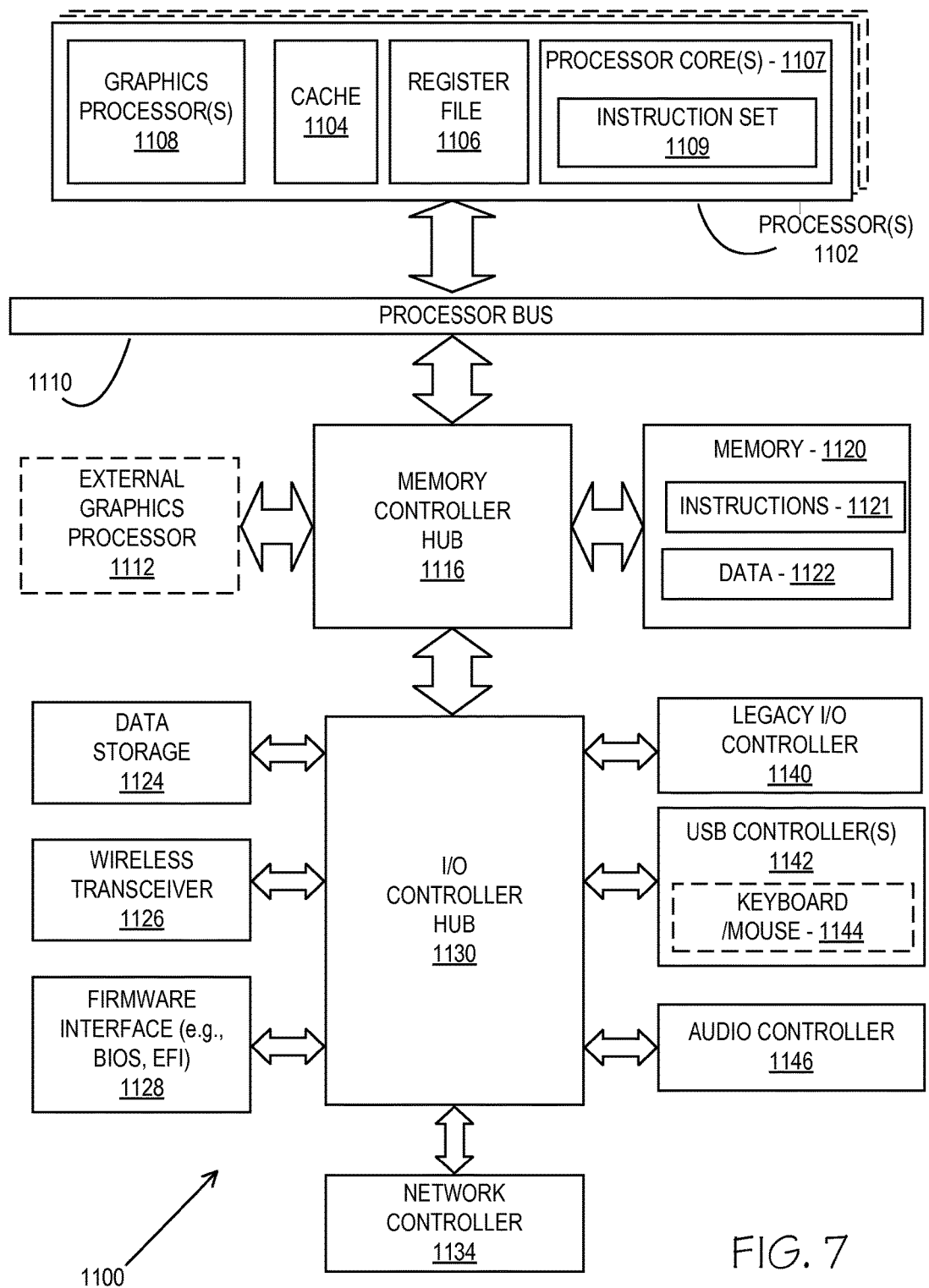
FIGS. 7-9 are block diagrams of an example of an overview of a data processing system according to an embodiment.
Figure 8:
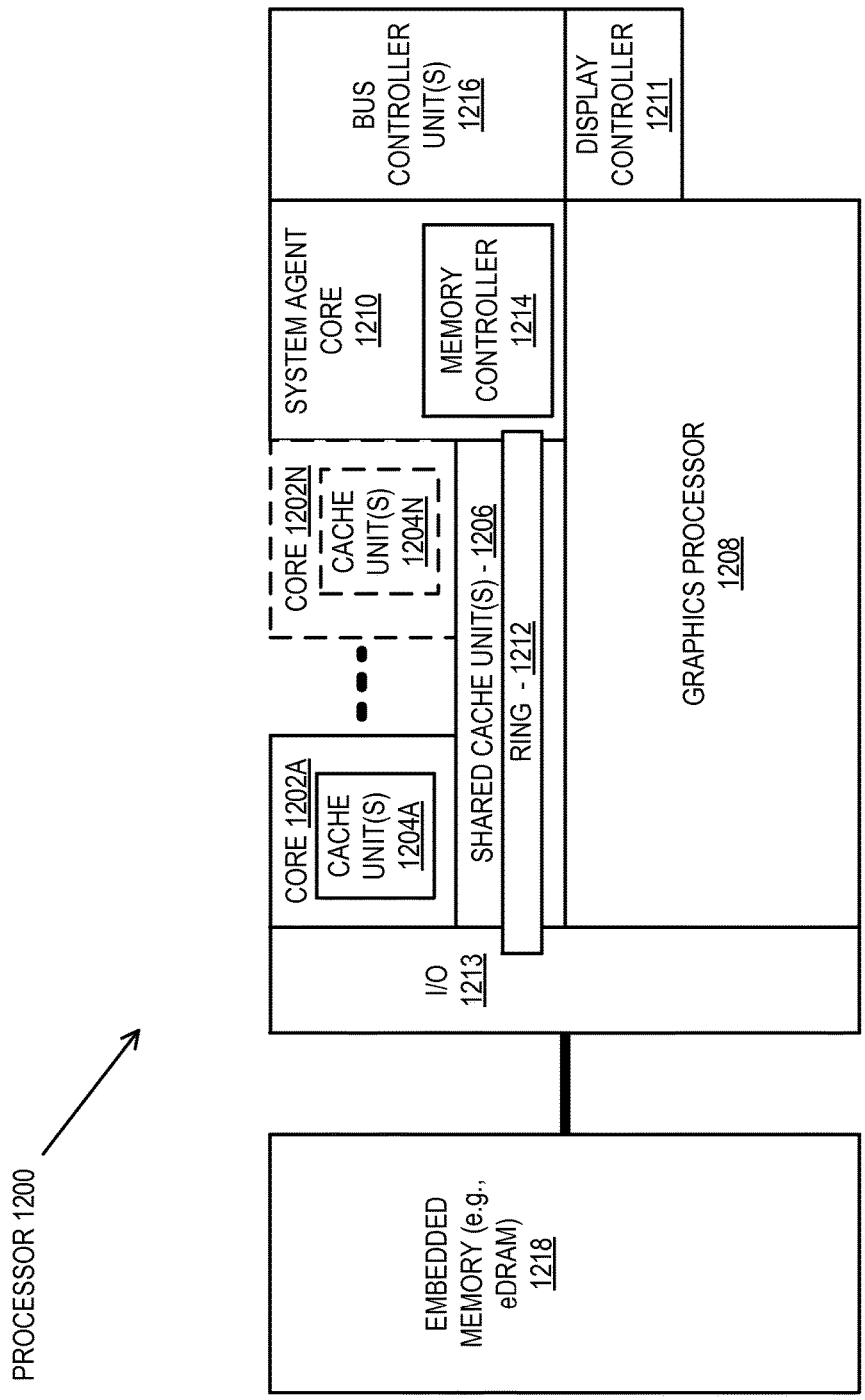
Figure 9:
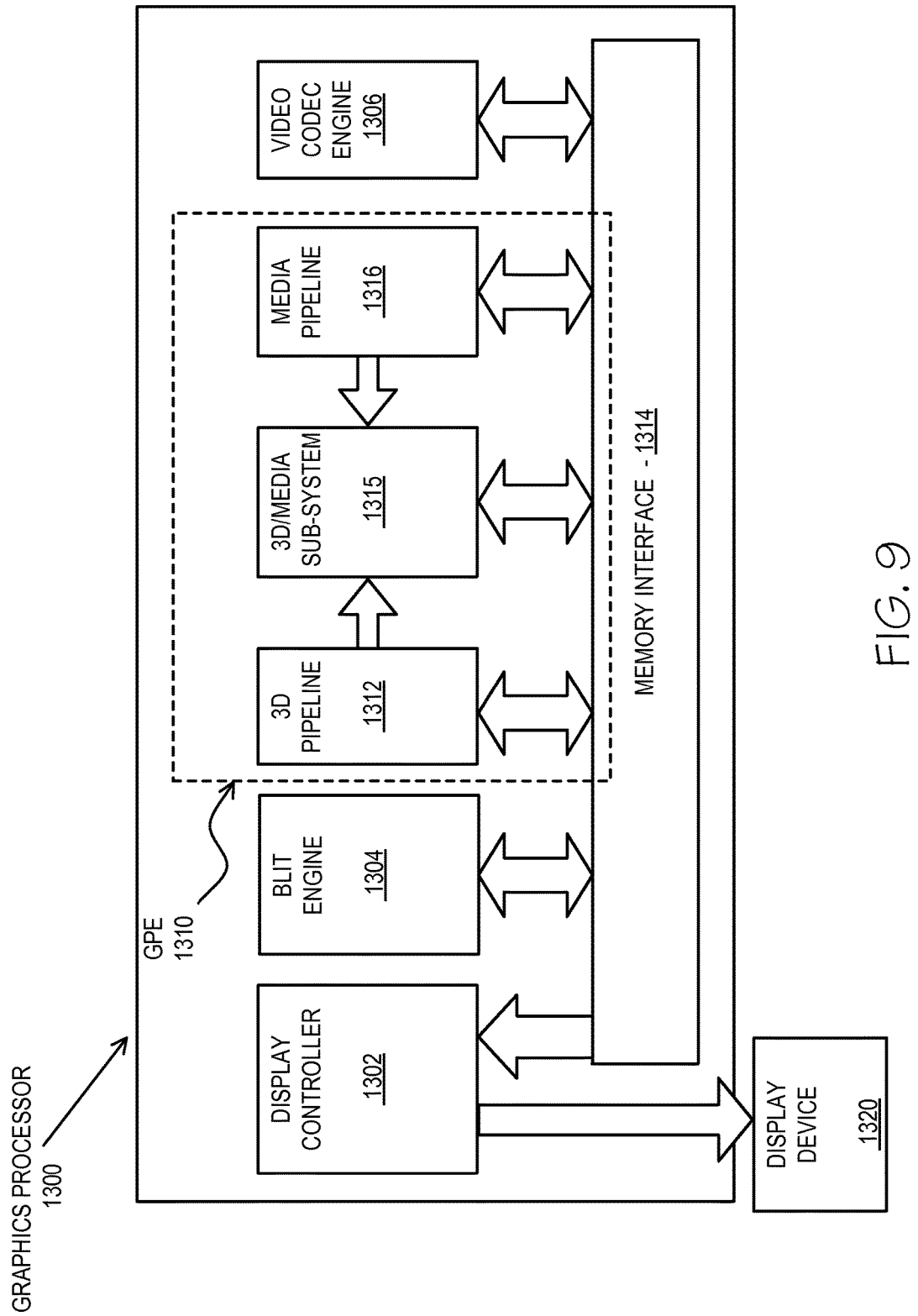

Overview—FIGS. 7-9

FIG. 7 is a block diagram of a data processing system 1100, according to an embodiment. The data processing system 1100 includes one or more processors 1102 and one or more graphics processors 1108, and may be a single processor desktop system, a multiprocessor workstation system, or a server system having a large number of processors 1102 or processor cores 1107. In one embodiment, the data processing system 1100 is a system on a chip (SOC) integrated circuit for use in mobile, handheld, or embedded devices.

An embodiment of the data processing system 1100 can include, or be incorporated within a server-based gaming platform, a game console, including a game and media console, a mobile gaming console, a handheld game console, or an online game console. In one embodiment, the data processing system 1100 is a mobile phone, smart phone, tablet computing device or mobile Internet device. The data processing system 1100 can also include, couple with, or be integrated within a wearable device, such as a smart watch wearable device, smart eyewear device, augmented reality device, or virtual reality device. In one embodiment, the data processing system 1100 is a television or set top box device having one or more processors 1102 and a graphical interface generated by one or more graphics processors 1108.

The one or more processors 1102 each include one or more processor cores 1107 to process instructions which, when executed, perform operations for system and user software. In one embodiment, each of the one or more processor cores 1107 is configured to process a specific instruction set 1109. The instruction set 1109 may facilitate complex instruction set computing (CISC), reduced instruction set computing (RISC), or computing via a very long instruction word (VLIW). Multiple processor cores 1107 may each process a different instruction set 1109 which may include instructions to facilitate the emulation of other instruction sets. A processor core 1107 may also include other processing devices, such a digital signal processor (DSP).

In one embodiment, the processor 1102 includes cache memory 1104. Depending on the architecture, the processor 1102 can have a single internal cache or multiple levels of internal cache. In one embodiment, the cache memory is shared among various components of the processor 1102. In one embodiment, the processor 1102 also uses an external cache (e.g., a Level 3 (L3) cache or last level cache (LLC)) (not shown) which may be shared among the processor cores 1107 using known cache coherency techniques. A register file 1106 is additionally included in the processor 1102 which may include different types of registers for storing different types of data (e.g., integer registers, floating point registers, status registers, and an instruction pointer register). Some registers may be general-purpose registers, while other registers may be specific to the design of the processor 1102.

The processor 1102 is coupled to a processor bus 1110 to transmit data signals between the processor 1102 and other components in the system 1100. The system 1100 uses an exemplary 'hub' system architecture, including a memory controller hub 1116 and an input output (I/O) controller hub 1130. The memory controller hub 1116 facilitates communication between a memory device and other components of the system 1100, while the I/O controller hub (ICH) 1130 provides connections to I/O devices via a local I/O bus.

The memory device 1120, can be a dynamic random access memory (DRAM) device, a static random access memory (SRAM) device, flash memory device, or some other memory device having suitable performance to serve as process memory. The memory 1120 can store data 1122 and instructions 1121 for use when the processor 1102 executes a process. The memory controller hub 1116 also couples with an optional external graphics processor 1112, which may communicate with the one or more graphics processors 1108 in the processors 1102 to perform graphics and media operations.

The ICH 1130 enables peripherals to connect to the memory 1120 and processor 1102 via a high-speed I/O bus. The I/O peripherals include an audio controller 1146, a firmware interface 1128, a wireless transceiver 1126 (e.g., Wi-Fi, Bluetooth), a data storage device 1124 (e.g., hard disk drive, flash memory, etc.), and a legacy I/O controller 1140 for coupling legacy (e.g., Personal System 2 (PS/2)) devices to the system. One or more Universal Serial Bus (USB) controllers 1142 connect input devices, such as keyboard and mouse 1144 combinations. A network controller 1134 may also couple to the ICH 1130. In one embodiment, a high-performance network controller (not shown) couples to the processor bus 1110.

FIG. 8 is a block diagram of an embodiment of a processor 1200 having one or more processor cores 1202A-N, an integrated memory controller 1214, and an integrated graphics processor 1208. The processor 1200 can include additional cores up to and including additional core 1202N represented by the dashed lined boxes. Each of the cores 1202A-N includes one or more internal cache units 1204A-N. In one embodiment each core also has access to one or more shared cached units 1206.

The internal cache units 1204A-N and shared cache units 1206 represent a cache memory hierarchy within the processor 1200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 1206 and 1204A-N.

The processor 1200 may also include a set of one or more bus controller units 1216 and a system agent 1210. The one or more bus controller units 1216 manage a set of peripheral buses, such as one or more Peripheral Component Interconnect buses (e.g., PCI, PCI Express). The system agent 1210 provides management functionality for the various processor components. In one embodiment, the system agent 1210 includes one or more integrated memory controllers 1214 to manage access to various external memory devices (not shown).

In one embodiment, one or more of the cores 1202A-N include support for simultaneous multi-threading. In such embodiment, the system agent 1210 includes components for coordinating and operating cores 1202A-N during multi-threaded processing. The system agent 1210 may additionally include a power control unit (PCU), which includes logic and components to regulate the power state of the cores 1202A-N and the graphics processor 1208.

The processor 1200 additionally includes a graphics processor 1208 to execute graphics processing operations. In one embodiment, the graphics processor 1208 couples with the set of shared cache units 1206, and the system agent unit 1210, including the one or more integrated memory controllers 1214. In one embodiment, a display controller 1211 is coupled with the graphics processor 1208 to drive graphics processor output to one or more coupled displays. The display controller 1211 may be a separate module coupled with the graphics processor via at least one interconnect, or may be integrated within the graphics processor 1208 or system agent 1210.

In one embodiment a ring based interconnect unit 1212 is used to couple the internal components of the processor 1200, however an alternative interconnect unit may be used, such as a point to point interconnect, a switched interconnect, or other techniques, including techniques well known in the art. In one embodiment, the graphics processor 1208 couples with the ring interconnect 1212 via an I/O link 1213.

The exemplary I/O link 1213 represents at least one of multiple varieties of I/O interconnects, including an on package I/O interconnect which facilitates communication between various processor components and a high-performance embedded memory module 1218, such as an eDRAM module. In one embodiment each of the cores 1202-N and the graphics processor 1208 use the embedded memory modules 1218 as shared last level cache.

In one embodiment cores 1202A-N are homogenous cores executing the same instruction set architecture. In another embodiment, the cores 1202A-N are heterogeneous in terms of instruction set architecture (ISA), where one or more of the cores 1202A-N execute a first instruction set, while at least one of the other cores executes a subset of the first instruction set or a different instruction set.

The processor 1200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 1200 can be implemented on one or more chips or as a system on a chip (SOC) integrated circuit having the illustrated components, in addition to other components.

FIG. 9 is a block diagram of one embodiment of a graphics processor 1300 which may be a discrete graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 1300 includes a memory interface 1314 to access memory. The memory interface 1314 can be an interface to local memory, one or more internal caches, one or more shared external caches, and/or to system memory.

The graphics processor 1300 also includes a display controller 1302 to drive display output data to a display device 1320. The display controller 1302 includes hardware for one or more overlay planes for the display and composition of multiple layers of video or user interface elements.

In one embodiment the graphics processor 1300 includes a video codec engine 1306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 1300 includes a block image transfer (BLIT) engine 1304 to perform two-dimensional (2D) rasterizer operations including, for example, bit-boundary block transfers. However, in one embodiment, 2D graphics operations are performed using one or more components of the graphics-processing engine (GPE) 1310. The graphics-processing engine 1310 is a compute engine for performing graphics operations, including three-dimensional (3D) graphics operations and media operations.

The GPE 1310 includes a 3D pipeline 1312 for performing 3D operations, such as rendering three-dimensional images and scenes using processing functions that act upon 3D primitive shapes (e.g., rectangle, triangle, etc.). The 3D pipeline 1312 includes programmable and fixed function elements that perform various tasks within the element and/or spawn execution threads to a 3D/Media sub-system 1315. While the 3D pipeline 1312 can be used to perform media operations, an embodiment of the GPE 1310 also includes a media pipeline 1316 that is specifically used to perform media operations, such as video post processing and image enhancement.

In one embodiment, the media pipeline 1316 includes fixed function or programmable logic units to perform one or more specialized media operations, such as video decode acceleration, video de-interlacing, and video encode acceleration in place of, or on behalf of the video codec engine 1306. In on embodiment, the media pipeline 1316 additionally includes a thread spawning unit to spawn threads for execution on the 3D/Media sub-system 1315. The spawned threads perform computations for the media operations on one or more graphics execution units included in the 3D/Media sub-system.

The 3D/Media subsystem 1315 includes logic for executing threads spawned by the 3D pipeline 1312 and media pipeline 1316. In one embodiment, the pipelines send thread execution requests to the 3D/Media subsystem 1315, which includes thread dispatch logic for arbitrating and dispatching the various requests to available thread execution resources. The execution resources include an array of graphics execution units to process the 3D and media threads. In one embodiment, the 3D/Media subsystem 1315 includes one or more internal caches for thread instructions and data. In one embodiment, the subsystem also includes shared memory, including registers and addressable memory, to share data between threads and to store output data.

Figure 10:
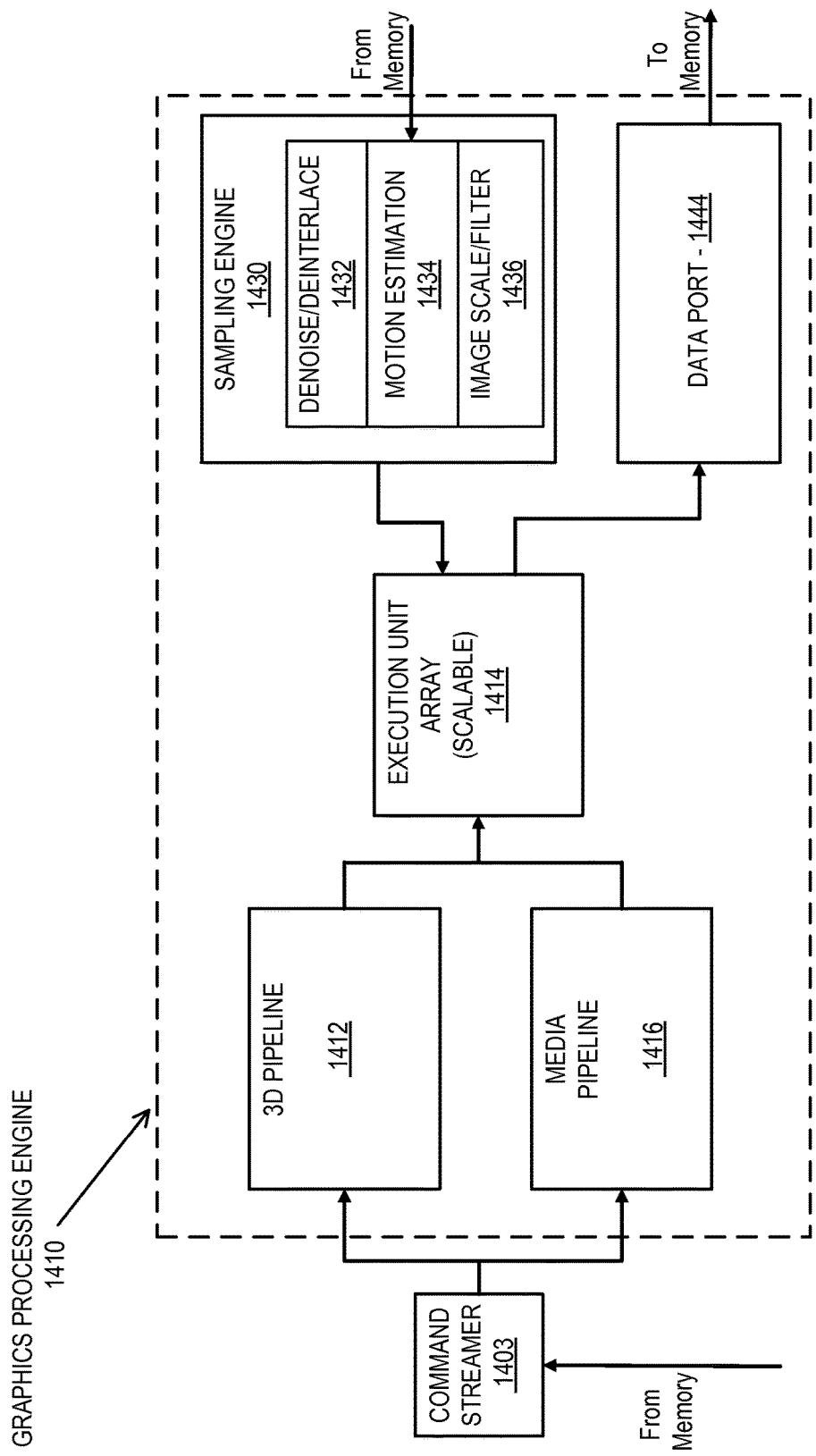
FIG. 10 is a block diagram of an example of a graphics processing engine according to an embodiment.

3D/Media Processing—FIG. 10

FIG. 10 is a block diagram of an embodiment of a graphics processing engine 1410 for a graphics processor. In one embodiment, the graphics processing engine (GPE) 1410 is a version of the GPE 1310 shown in FIG. 9. The GPE 1410 includes a 3D pipeline 1412 and a media pipeline 1416, each of which can be either different from or similar to the implementations of the 3D pipeline 1312 and the media pipeline 1316 of FIG. 9.

In one embodiment, the GPE 1410 couples with a command streamer 1403, which provides a command stream to the GPE 3D and media pipelines 1412, 1416. The command streamer 1403 is coupled to memory, which can be system memory, or one or more of internal cache memory and shared cache memory. The command streamer 1403 receives commands from the memory and sends the commands to the 3D pipeline 1412 and/or media pipeline 1416. The 3D and media pipelines process the commands by performing operations via logic within the respective pipelines or by dispatching one or more execution threads to the execution unit array 1414. In one embodiment, the execution unit array 1414 is scalable, such that the array includes a variable number of execution units based on the target power and performance level of the GPE 1410.

A sampling engine 1430 couples with memory (e.g., cache memory or system memory) and the execution unit array 1414. In one embodiment, the sampling engine 1430 provides a memory access mechanism for the scalable execution unit array 1414 that allows the execution unit array 1414 to read graphics and media data from memory. In one embodiment, the sampling engine 1430 includes logic to perform specialized image sampling operations for media.

The specialized media sampling logic in the sampling engine 1430 includes a de-noise/de-interlace module 1432, a motion estimation module 1434, and an image scaling and filtering module 1436. The de-noise/de-interlace module 1432 includes logic to perform one or more of a de-noise or a de-interlace algorithm on decoded video data. The de-interlace logic combines alternating fields of interlaced video content into a single frame of video. The de-noise logic reduces or removes data noise from video and image data. In one embodiment, the de-noise logic and de-interlace logic are motion adaptive and use spatial or temporal filtering based on the amount of motion detected in the video data. In one embodiment, the de-noise/de-interlace module 1432 includes dedicated motion detection logic (e.g., within the motion estimation engine 1434).

The motion estimation engine 1434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 1434 to perform operations on video at the macro-block level that may otherwise be computationally intensive to perform using a general-purpose processor. In one embodiment, the motion estimation engine 1434 is generally available to graphics processor components to assist with video decode and processing functions that are sensitive or adaptive to the direction or magnitude of the motion within video data.

The image scaling and filtering module 1436 performs image-processing operations to enhance the visual quality of generated images and video. In one embodiment, the scaling and filtering module 1436 processes image and video data during the sampling operation before providing the data to the execution unit array 1414.

In one embodiment, the graphics processing engine 1410 includes a data port 1444, which provides an additional mechanism for graphics subsystems to access memory. The data port 1444 facilitates memory access for operations including render target writes, constant buffer reads, scratch memory space reads/writes, and media surface accesses. In one embodiment, the data port 1444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 1414 communicate with the data port by exchanging messages via a data distribution interconnect that couples each of the sub-systems of the graphics processing engine 1410.

Figure 11:
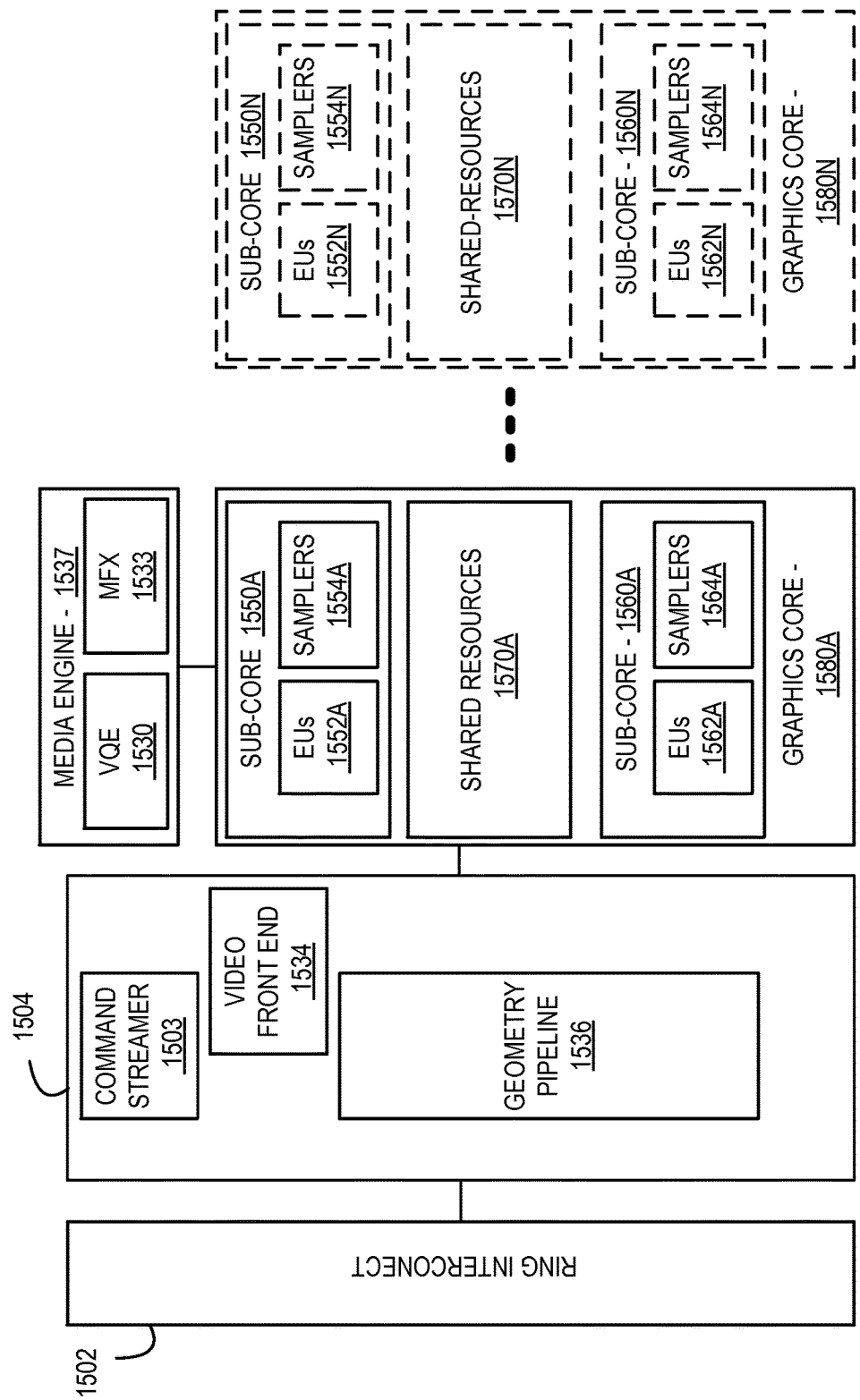
FIGS. 11-13 are block diagrams of examples of execution units according to an embodiment.
Figure 12:
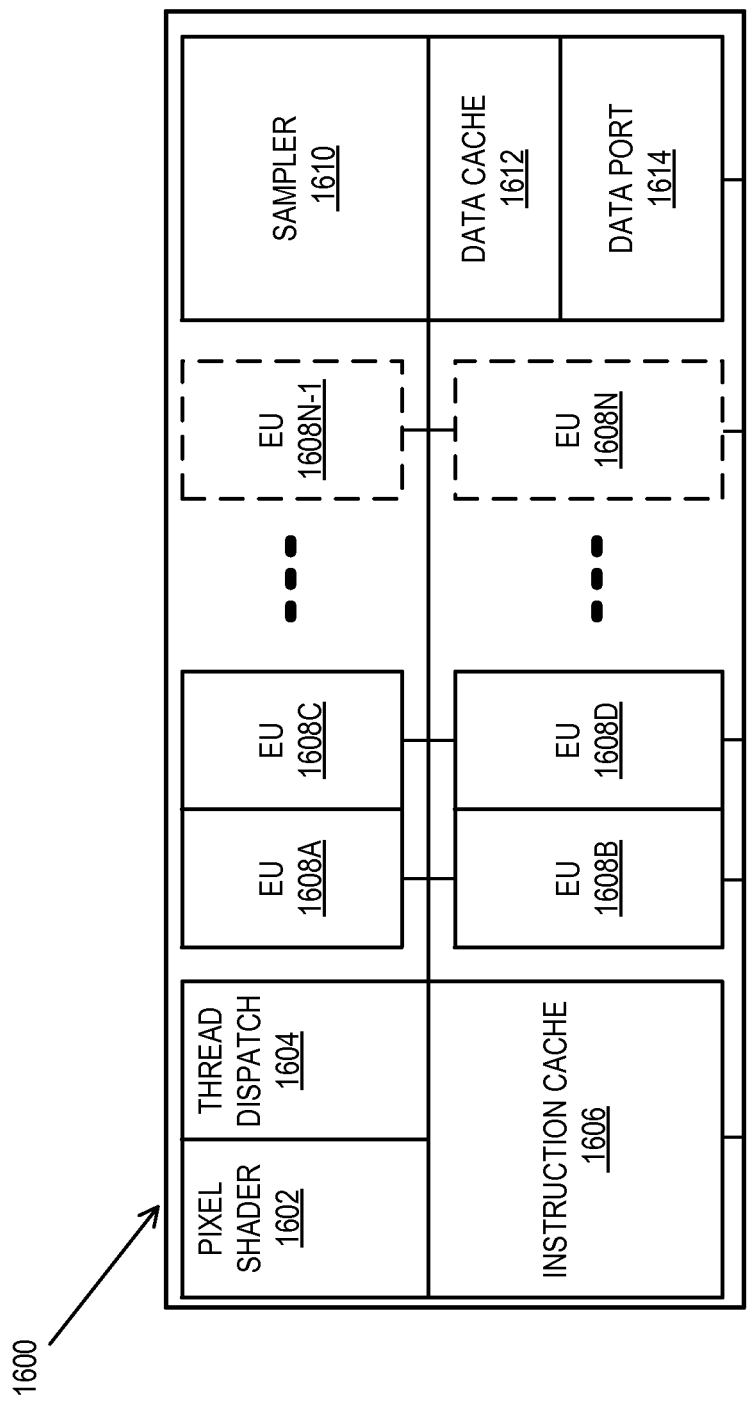
Figure 13:
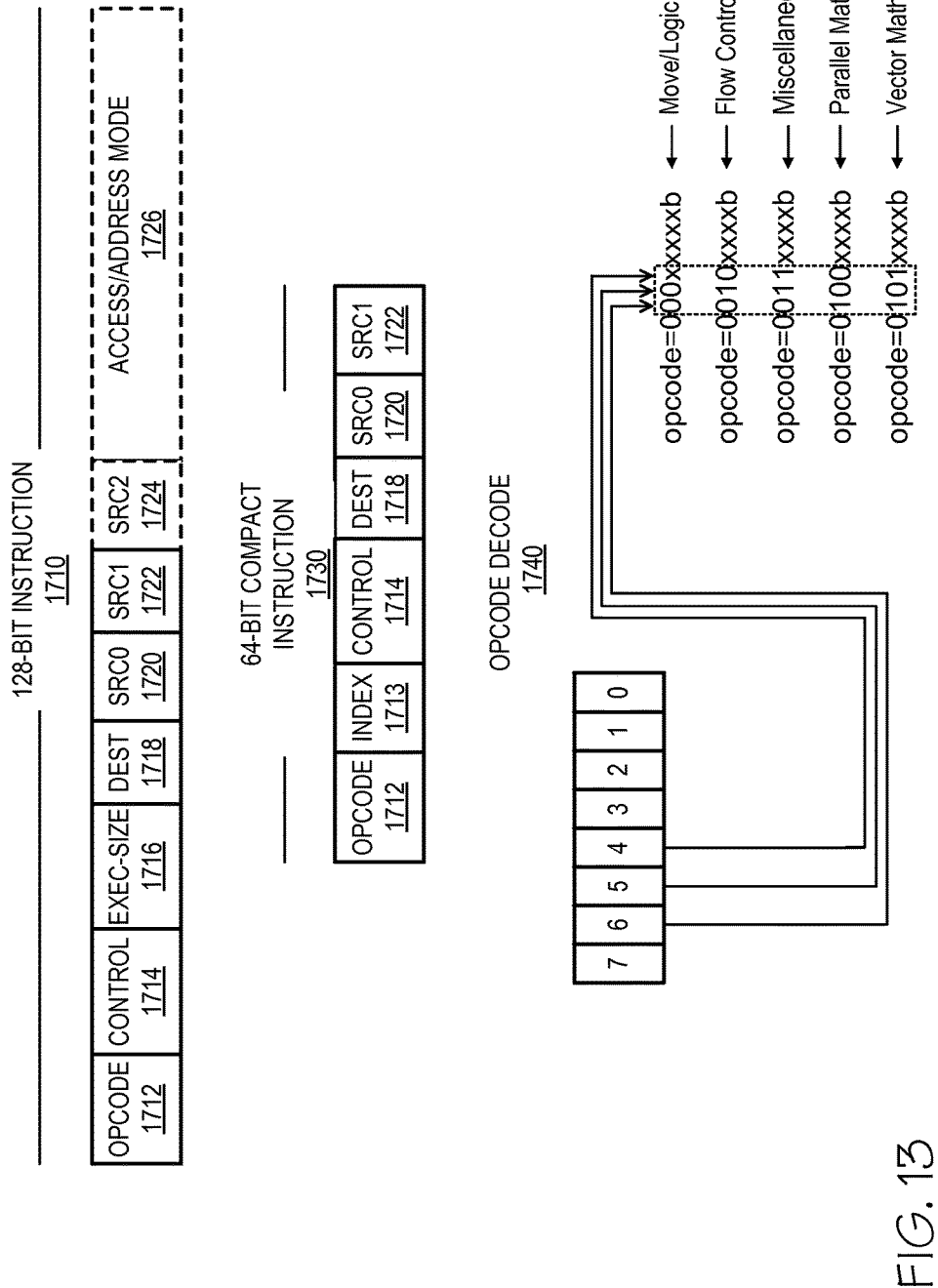

Execution Units—FIGS. 11-13

FIG. 11 is a block diagram of another embodiment of a graphics processor. In one embodiment, the graphics processor includes a ring interconnect 1502, a pipeline front-end 1504, a media engine 1537, and graphics cores 1580A-N. The ring interconnect 1502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 1502. The incoming commands are interpreted by a command streamer 1503 in the pipeline front-end 1504. The graphics processor includes scalable execution logic to perform 3D geometry processing and media processing via the graphics core(s) 1580A-N. For 3D geometry processing commands, the command streamer 1503 supplies the commands to the geometry pipeline 1536. For at least some media processing commands, the command streamer 1503 supplies the commands to a video front end 1534, which couples with the media engine 1537. The media engine 1537 includes a video quality engine (VQE) 1530 for video and image post processing and a multi-format encode/decode (MFX) 1533 engine to provide hardware-accelerated media data encode and decode. The geometry pipeline 1536 and media engine 1537 each generate execution threads for the thread execution resources provided by at least one graphics core 1580A.

The graphics processor includes scalable thread execution resources featuring modular cores 1580A-N (sometime referred to as core slices), each having multiple sub-cores 1550A-N, 1560A-N (sometimes referred to as core sub-slices). The graphics processor can have any number of graphics cores 1580A through 1580N. In one embodiment, the graphics processor includes a graphics core 1580A having at least a first sub-core 1550A and a second core sub-core 1560A. In another embodiment, the graphics processor is a low power processor with a single sub-core (e.g., 1550A). In one embodiment, the graphics processor includes multiple graphics cores 1580A-N, each including a set of first sub-cores 1550A-N and a set of second sub-cores 1560A-N. Each sub-core in the set of first sub-cores 1550A-N includes at least a first set of execution units 1552A-N and media/texture samplers 1554A-N. Each sub-core in the set of second sub-cores 1560A-N includes at least a second set of execution units 1562A-N and samplers 1564A-N. In one embodiment, each sub-core 1550A-N, 1560A-N shares a set of shared resources 1570A-N. In one embodiment, the shared resources include shared cache memory and pixel operation logic. Other shared resources may also be included in the various embodiments of the graphics processor.

FIG. 12 illustrates thread execution logic 1600 including an array of processing elements employed in one embodiment of a graphics processing engine. In one embodiment, the thread execution logic 1600 includes a pixel shader 1602, a thread dispatcher 1604, instruction cache 1606, a scalable execution unit array including a plurality of execution units 1608A-N, a sampler 1610, a data cache 1612, and a data port 1614. In one embodiment the included components are interconnected via an interconnect fabric that links to each of the components. The thread execution logic 1600 includes one or more connections to memory, such as system memory or cache memory, through one or more of the instruction cache 1606, the data port 1614, the sampler 1610, and the execution unit array 1608A-N. In one embodiment, each execution unit (e.g. 1608A) is an individual vector processor capable of executing multiple simultaneous threads and processing multiple data elements in parallel for each thread. The execution unit array 1608A-N includes any number individual execution units.

In one embodiment, the execution unit array 1608A-N is primarily used to execute "shader" programs. In one embodiment, the execution units in the array 1608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 1608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 1608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 1606) are included in the thread execution logic 1600 to cache thread instructions for the execution units. In one embodiment, one or more data caches (e.g., 1612) are included to cache thread data during thread execution. A sampler 1610 is included to provide texture sampling for 3D operations and media sampling for media operations. In one embodiment, the sampler 1610 includes specialized texture or media sampling functionality to process texture or media data during the sampling process before providing the sampled data to an execution unit.

During execution, the graphics and media pipelines send thread initiation requests to the thread execution logic 1600 via thread spawning and dispatch logic. The thread execution logic 1600 includes a local thread dispatcher 1604 that arbitrates thread initiation requests from the graphics and media pipelines and instantiates the requested threads on one or more execution units 1608A-N. For example, the geometry pipeline (e.g., 1536 of FIG. 11) dispatches vertex processing, tessellation, or geometry processing threads to the thread execution logic 1600. The thread dispatcher 1604 can also process runtime thread spawning requests from the executing shader programs.

Once a group of geometric objects have been processed and rasterized into pixel data, the pixel shader 1602 is invoked to further compute output information and cause results to be written to output surfaces (e.g., color buffers, depth buffers, stencil buffers, etc.). In one embodiment, the pixel shader 1602 calculates the values of the various vertex attributes that are to be interpolated across the rasterized object. The pixel shader 1602 then executes an API-supplied pixel shader program. To execute the pixel shader program, the pixel shader 1602 dispatches threads to an execution unit (e.g., 1608A) via the thread dispatcher 1604. The pixel shader 1602 uses texture sampling logic in the sampler 1610 to access texture data in texture maps stored in memory. Arithmetic operations on the texture data and the input geometry data compute pixel color data for each geometric fragment, or discards one or more pixels from further processing.

In one embodiment, the data port 1614 provides a memory access mechanism for the thread execution logic 1600 output processed data to memory for processing on a graphics processor output pipeline. In one embodiment, the data port 1614 includes or couples to one or more cache memories (e.g., data cache 1612) to cache data for memory access via the data port.

FIG. 13 is a block diagram illustrating a graphics processor execution unit instruction format 1700 according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 1710. A 64-bit compacted instruction format 1730 is available for some instructions based on the selected instruction, instruction options, and number of operands. The native 128-bit format 1710 provides access to all instruction options, while some options and operations are restricted in the 64-bit format 1730. The native instructions available in the 64-bit format 1730 varies by embodiment. In one embodiment, the instruction is compacted in part using a set of index values in an index field 1713. The execution unit hardware references a set of compaction tables based on the index values and uses the compaction table outputs to reconstruct a native instruction in the 128-bit format 1710.

For each format, an instruction opcode 1712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 1714 enables control over certain execution options, such as channel selection (e.g., predication) and data channel order (e.g., swizzle). For 128-bit instructions 1710 an exec-size field 1716 limits the number of data channels that will be executed in parallel. The exec-size field 1716 is not available for use in the 64-bit compact instruction format 1730.

Some execution unit instructions have up to three operands including two source operands, src0 1720, src1 1722, and one destination 1718. In one embodiment, the execution units support dual destination instructions, where one of the destinations is implied. Data manipulation instructions can have a third source operand (e.g., SRC2 1724), where the instruction opcode 1712 determines the number of source operands. An instruction's last source operand can be an immediate (e.g., hard-coded) value passed with the instruction.

In one embodiment instructions are grouped based on opcode bit-fields to simplify Opcode decode 1740. For an 8-bit opcode, bits 4, 5, and 6 allow the execution unit to determine the type of opcode. The precise opcode grouping shown is exemplary. In one embodiment, a move and logic opcode group 1742 includes data movement and logic instructions (e.g., mov, cmp). The move and logic group 1742 shares the five most significant bits (MSB), where move instructions are in the form of 0000xxxxb (e.g., 0x0x) and logic instructions are in the form of 0001xxxxb (e.g., 0x01). A flow control instruction group 1744 (e.g., call, jmp) includes instructions in the form of 0010xxxxb (e.g., 0x20). A miscellaneous instruction group 1746 includes a mix of instructions, including synchronization instructions (e.g., wait, send) in the form of 0011xxxxb (e.g., 0x30). A parallel math instruction group 1748 includes component-wise arithmetic instructions (e.g., add, mul) in the form of 0100xxxxb (e.g., 0x40). The parallel math group 1748 performs the arithmetic operations in parallel across data channels. The vector math group 1750 includes arithmetic instructions (e.g., dp4) in the form of 0101xxxxb (e.g., 0x50). The vector math group performs arithmetic such as dot product calculations on vector operands.

Figure 14:
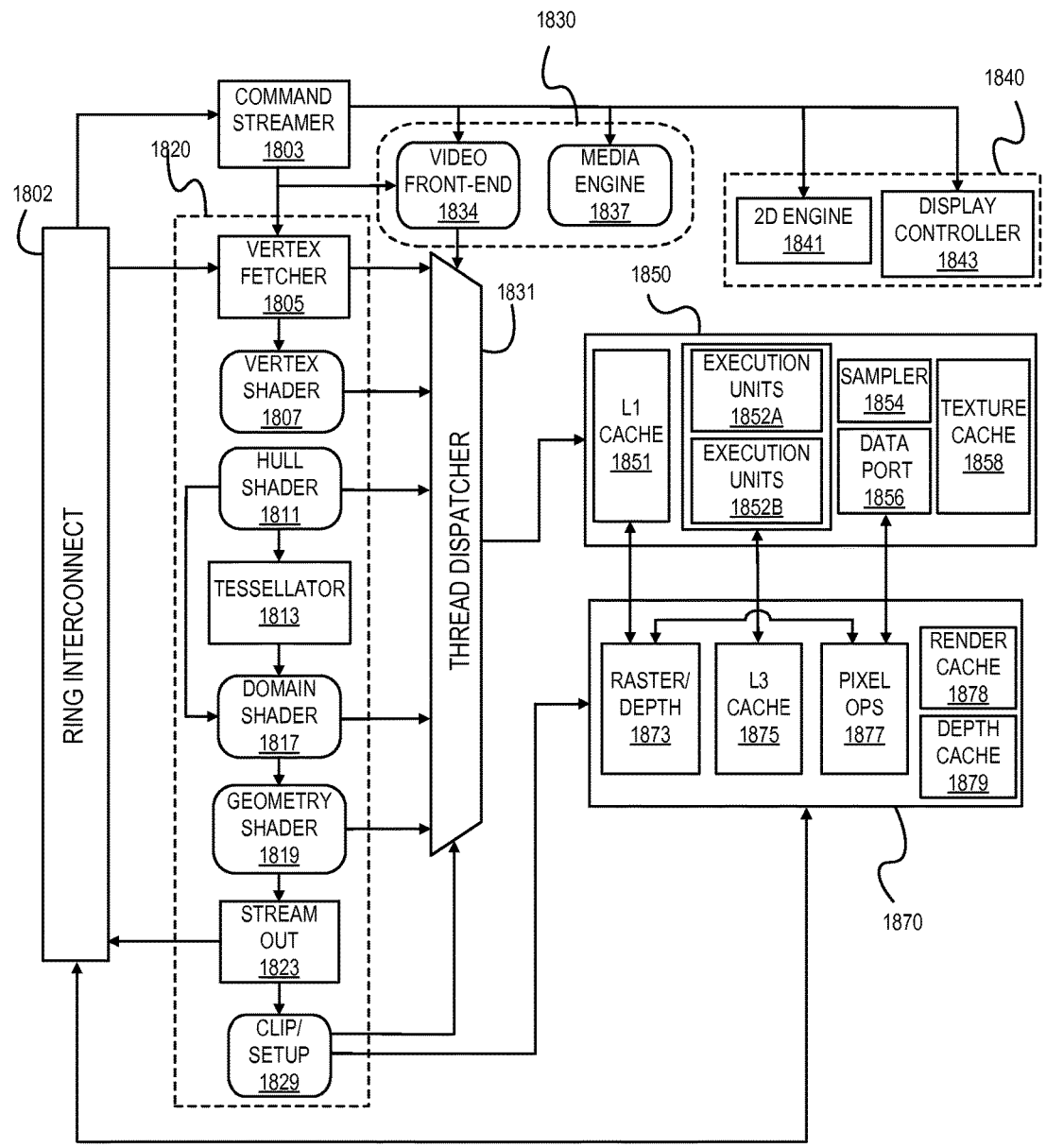
FIG. 14 is a block diagram of an example of a graphics pipeline according to an embodiment.

Graphics Pipeline—FIG. 14

FIG. 14 is a block diagram of another embodiment of a graphics processor which includes a graphics pipeline 1820, a media pipeline 1830, a display engine 1840, thread execution logic 1850, and a render output pipeline 1870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 1802. The ring interconnect 1802 couples the graphics processor to other processing components, such as other graphics processors or general-purpose processors. Commands from the ring interconnect are interpreted by a command streamer 1803 which supplies instructions to individual components of the graphics pipeline 1820 or media pipeline 1830.

The command streamer 1803 directs the operation of a vertex fetcher 1805 component that reads vertex data from memory and executes vertex-processing commands provided by the command streamer 1803. The vertex fetcher 1805 provides vertex data to a vertex shader 1807, which performs coordinate space transformation and lighting operations to each vertex. The vertex fetcher 1805 and vertex shader 1807 execute vertex-processing instructions by dispatching execution threads to the execution units 1852A, 1852B via a thread dispatcher 1831.

In one embodiment, the execution units 1852A, 1852B are an array of vector processors having an instruction set for performing graphics and media operations. The execution units 1852A, 1852B have an attached L1 cache 1851 that is specific for each array or shared between the arrays. The cache can be configured as a data cache, an instruction cache, or a single cache that is partitioned to contain data and instructions in different partitions.

In one embodiment, the graphics pipeline 1820 includes tessellation components to perform hardware-accelerated tessellation of 3D objects. A programmable hull shader 1811 configures the tessellation operations. A programmable domain shader 1817 provides back-end evaluation of tessellation output. A tessellator 1813 operates at the direction of the hull shader 1811 and contains special purpose logic to generate a set of detailed geometric objects based on a coarse geometric model that is provided as input to the graphics pipeline 1820. If tessellation is not used, the tessellation components 1811, 1813, 1817 can be bypassed.

The complete geometric objects can be processed by a geometry shader 1819 via one or more threads dispatched to the execution units 1852A, 1852B, or can proceed directly to the clipper 1829. The geometry shader operates on entire geometric objects, rather than vertices or patches of vertices as in previous stages of the graphics pipeline. If the tessellation is disabled the geometry shader 1819 receives input from the vertex shader 1807. The geometry shader 1819 is programmable by a geometry shader program to perform geometry tessellation if the tessellation units are disabled.

Prior to rasterization, vertex data is processed by a clipper 1829, which is either a fixed function clipper or a programmable clipper having clipping and geometry shader functions. In one embodiment, a rasterizer 1873 in the render output pipeline 1870 dispatches pixel shaders to convert the geometric objects into their per pixel representations. In one embodiment, pixel shader logic is included in the thread execution logic 1850.

The graphics engine has an interconnect bus, interconnect fabric, or some other interconnect mechanism that allows data and message passing amongst the major components of the graphics engine. In one embodiment the execution units 1852A, 1852B and associated cache(s) 1851, texture and media sampler 1854, and texture/sampler cache 1858 interconnect via a data port 1856 to perform memory access and communicate with render output pipeline components of the graphics engine. In one embodiment, the sampler 1854, caches 1851, 1858 and execution units 1852A, 1852B each have separate memory access paths.

In one embodiment, the render output pipeline 1870 contains a rasterizer and depth test component 1873 that converts vertex-based objects into their associated pixel-based representation. In one embodiment, the rasterizer logic includes a windower/masker unit to perform fixed function triangle and line rasterization. An associated render and depth buffer caches 1878, 1879 are also available in one embodiment. A pixel operations component 1877 performs pixel-based operations on the data, though in some instances, pixel operations associated with 2D operations (e.g. bit block image transfers with blending) are performed by the 2D engine 1841, or substituted at display time by the display controller 1843 using overlay display planes. In one embodiment a shared L3 cache 1875 is available to all graphics components, allowing the sharing of data without the use of main system memory.

The graphics processor media pipeline 1830 includes a media engine 1837 and a video front end 1834. In one embodiment, the video front end 1834 receives pipeline commands from the command streamer 1803. However, in one embodiment the media pipeline 1830 includes a separate command streamer. The video front-end 1834 processes media commands before sending the command to the media engine 1837. In one embodiment, the media engine 1837 includes thread spawning functionality to spawn threads for dispatch to the thread execution logic 1850 via the thread dispatcher 1831.

In one embodiment, the graphics engine includes a display engine 1840. In one embodiment, the display engine 1840 is external to the graphics processor and couples with the graphics processor via the ring interconnect 1802, or some other interconnect bus or fabric. The display engine 1840 includes a 2D engine 1841 and a display controller 1843. The display engine 1840 contains special purpose logic capable of operating independently of the 3D pipeline. The display controller 1843 couples with a display device (not shown), which may be a system integrated display device, as in a laptop computer, or an external display device attached via an display device connector.

The graphics pipeline 1820 and media pipeline 1830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 15A:
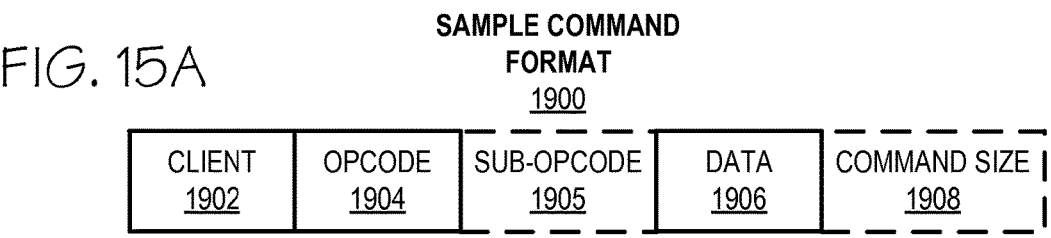
FIGS. 15A-15B are block diagrams of examples of graphics pipeline programming according to an embodiment.
Figure 15B:
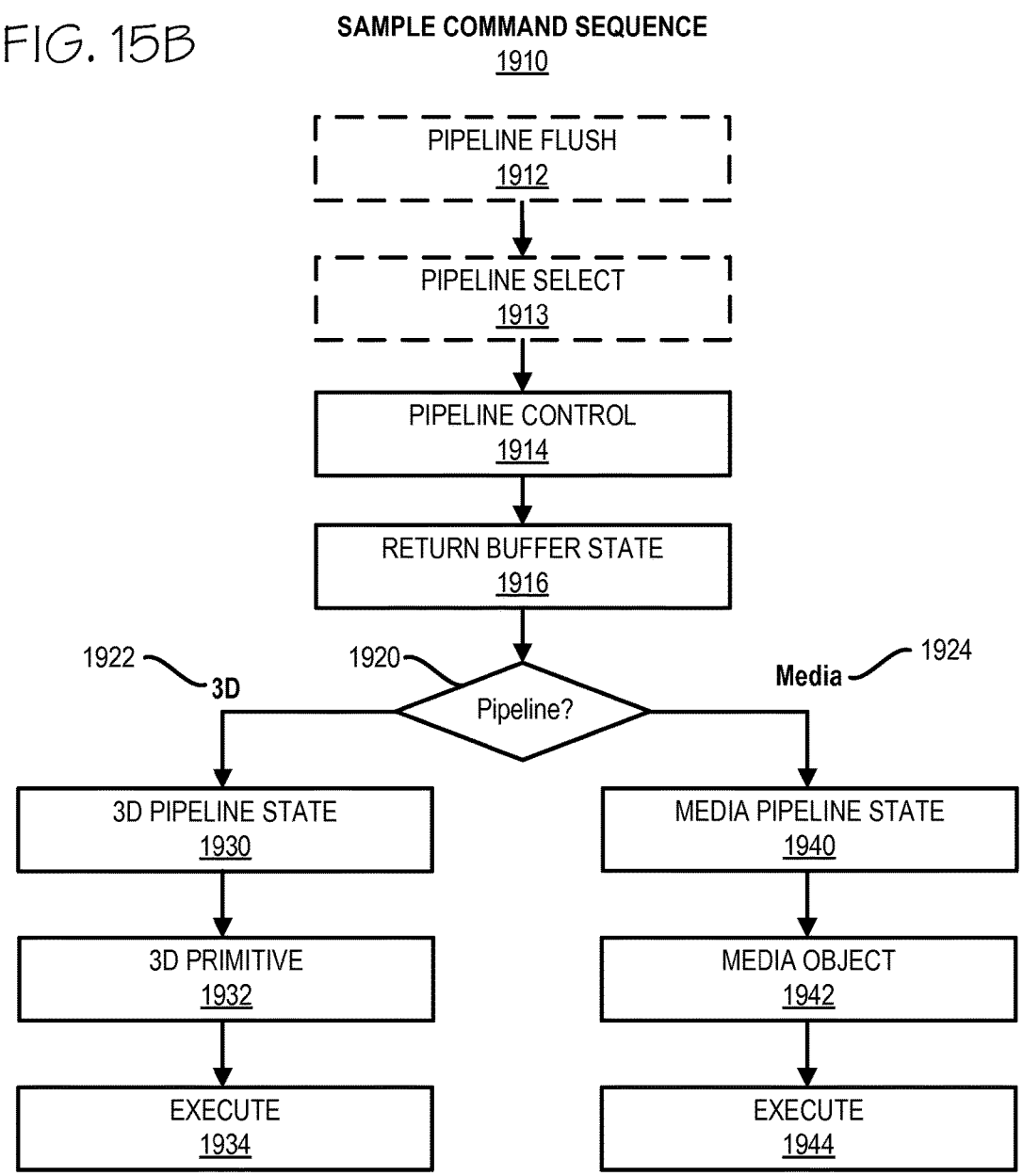

Graphics Pipeline Programming—FIGS. 15A-B

FIG. 15A is a block diagram illustrating a graphics processor command format according to an embodiment and FIG. 15B is a block diagram illustrating a graphics processor command sequence according to an embodiment. The solid lined boxes in FIG. 15A illustrate the components that are generally included in a graphics command while the dashed lines include components that are optional or that are only included in a sub-set of the graphics commands. The exemplary graphics processor command format 1900 of FIG. 15A includes data fields to identify a target client 1902 of the command, a command operation code (opcode) 1904, and the relevant data 1906 for the command. A sub-opcode 1905 and a command size 1908 are also included in some commands.

The client 1902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1904 and, if present, sub-opcode 1905 to determine the operation to perform. The client unit performs the command using information in the data 1906 field of the command. For some commands an explicit command size 1908 is expected to specify the size of the command. In one embodiment, the command parser automatically determines the size of at least some of the commands based on the command opcode. In one embodiment commands are aligned via multiples of a double word.

The flow chart in FIG. 15B shows a sample command sequence 1910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 1910 may begin with a pipeline flush command 1912 to cause any active graphics pipeline to complete the currently pending commands for the pipeline. In one embodiment, the 3D pipeline 1922 and the media pipeline 1924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 1912 can be used for pipeline synchronization or before placing the graphics processor into a low power state.

A pipeline select command 1913 is used when a command sequence requires the graphics processor to explicitly switch between pipelines. A pipeline select command 1913 is required only once within an execution context before issuing pipeline commands unless the context is to issue commands for both pipelines. In one embodiment, a pipeline flush command is 1912 is required immediately before a pipeline switch via the pipeline select command 1913.

A pipeline control command 1914 configures a graphics pipeline for operation and is used to program the 3D pipeline 1922 and the media pipeline 1924. The pipeline control command 1914 configures the pipeline state for the active pipeline. In one embodiment, the pipeline control command 1914 is used for pipeline synchronization and to clear data from one or more cache memories within the active pipeline before processing a batch of commands.

Return buffer state commands 1916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state commands 1916 include selecting the size and number of return buffers to use for a set of pipeline operations.

The remaining commands in the command sequence differ based on the active pipeline for operations. Based on a pipeline determination 1920, the command sequence is tailored to the 3D pipeline 1922 beginning with the 3D pipeline state 1930, or the media pipeline 1924 beginning at the media pipeline state 1940.

The commands for the 3D pipeline state 1930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 1930 commands are also able to selectively disable or bypass certain pipeline elements if those elements will not be used.

The 3D primitive 1932 command is used to submit 3D primitives to be processed by the 3D pipeline. Commands and associated parameters that are passed to the graphics processor via the 3D primitive 1932 command are forwarded to the vertex fetch function in the graphics pipeline. The vertex fetch function uses the 3D primitive 1932 command data to generate vertex data structures. The vertex data structures are stored in one or more return buffers. The 3D primitive 1932 command is used to perform vertex operations on 3D primitives via vertex shaders. To process vertex shaders, the 3D pipeline 1922 dispatches shader execution threads to graphics processor execution units.

The 3D pipeline 1922 is triggered via an execute 1934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 1910 follows the media pipeline 1924 path when performing media operations. In general, the specific use and manner of programming for the media pipeline 1924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 1924 is configured in a similar manner as the 3D pipeline 1922. A set of media pipeline state commands 1940 are dispatched or placed into in a command queue before the media object commands 1942. The media pipeline state commands 1940 include data to configure the media pipeline elements that will be used to process the media objects. This includes data to configure the video decode and video encode logic within the media pipeline, such as encode or decode format. The media pipeline state commands 1940 also support the use of one or more pointers to "indirect" state elements that contain a batch of state settings.

Media object commands 1942 supply pointers to media objects for processing by the media pipeline. The media objects include memory buffers containing video data to be processed. In one embodiment, all media pipeline state must be valid before issuing a media object command 1942. Once the pipeline state is configured and media object commands 1942 are queued, the media pipeline 1924 is triggered via an execute 1944 command or an equivalent execute event (e.g., register write). Output from the media pipeline 1924 may then be post processed by operations provided by the 3D pipeline 1922 or the media pipeline 1924. In one embodiment, GPGPU operations are configured and executed in a similar manner as media operations.

Figure 16:
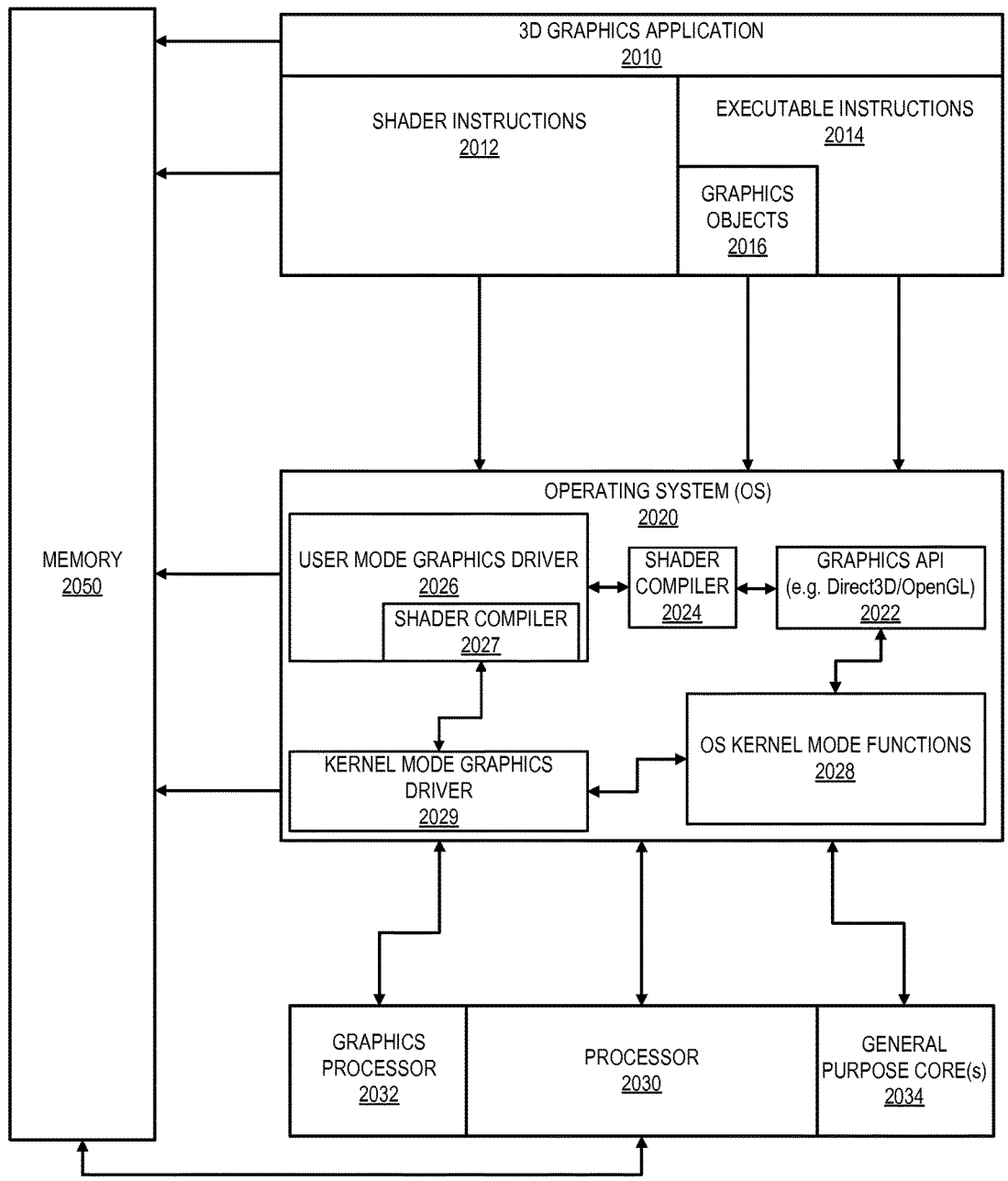
FIG. 16 is a block diagram of an example of a graphics software architecture according to an embodiment.

Graphics Software Architecture—FIG. 16

FIG. 16 illustrates exemplary graphics software architecture for a data processing system according to an embodiment. The software architecture includes a 3D graphics application 2010, an operating system 2020, and at least one processor 2030. The processor 2030 includes a graphics processor 2032 and one or more general-purpose processor core(s) 2034. The graphics application 2010 and operating system 2020 each execute in the system memory 2050 of the data processing system.

In one embodiment, the 3D graphics application 2010 contains one or more shader programs including shader instructions 2012. The shader language instructions may be in a high-level shader language, such as the High Level Shader Language (HLSL) or the OpenGL Shader Language (GLSL). The application also includes executable instructions 2014 in a machine language suitable for execution by the general-purpose processor core 2034. The application also includes graphics objects 2016 defined by vertex data.

The operating system 2020 may be a Microsoft® Windows® operating system from the Microsoft Corporation, a proprietary UNIX-like operating system, or an open source UNIX-like operating system using a variant of the Linux kernel. When the Direct3D API is in use, the operating system 2020 uses a front-end shader compiler 2024 to compile any shader instructions 2012 in HLSL into a lower-level shader language. The compilation may be a just-in-time compilation or the application can perform share precompilation. In one embodiment, high-level shaders are compiled into low-level shaders during the compilation of the 3D graphics application 2010.

The user mode graphics driver 2026 may contain a back-end shader compiler 2027 to convert the shader instructions 2012 into a hardware specific representation. When the OpenGL API is in use, shader instructions 2012 in the GLSL high-level language are passed to a user mode graphics driver 2026 for compilation. The user mode graphics driver uses operating system kernel mode functions 2028 to communicate with a kernel mode graphics driver 2029. The kernel mode graphics driver 2029 communicates with the graphics processor 2032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Additional Notes and Examples

Example 1 may include a method to execute an instruction in a processor, comprising determining a first set of operating conditions in which a first set of logic circuits is to be powered for execution of an instruction to produce correct output, and determining a second set of operating conditions in which a second set of logic circuits is to be powered for execution of the instruction to produce correct output, wherein the second set of logic circuits is a proper subset of the first set, and wherein execution of the instruction requires less power when executed under the second set of operating conditions than when executed under the first set of operating conditions.

Example 2 may include the method of Example 1, wherein the first set of logic circuits includes one or more of an adder, a shifter unit, a multiplier, or a two's complement unit.

Example 3 may include the method of any one of Examples 1 to 2, further including examining operands on which the instruction operates to determine which of the first and second sets of operating conditions prevails.

Example 4 may include the method of any one of Examples 1 to 3, wherein the instruction adds two floating point numbers.

Example 5 may include the method of any one of Examples 1 to 4, wherein the instruction multiplies two floating point numbers.

Example 6 may include the method of any one of Examples 1 to 5, wherein the instruction compares two floating point numbers.

Example 7 may include the method of any one of Examples 1 to 6, wherein the instruction executes a fused multiply-add instruction.

Example 8 may include the method of any one of Examples 1 to 7, wherein determination of the second set of operating conditions includes examining the operands to determine if one or more of the operands is zero, infinite, denormal, unitary, or not a valid number.

Example 9 may include the method of any one of Examples 1 to 8, wherein determination of whether correct output is provided upon execution of the instruction is determined with reference to a known standard for the instruction.

Example 10 may include the method of any one of Examples 1 to 9, wherein determination of the second set of operating conditions includes comparing magnitudes of at least two operands and executing the instruction under the second set of operating conditions if the magnitudes are more than a predetermined amount apart.

Example 11 may include the method of any one of Examples 1 to 10, wherein determination of the second set of operating conditions includes consideration of rounding conditions.

Example 12 may include a processor to execute an instruction, comprising logic, implemented at least partly in fixed-functionality hardware, to determine a first set of operating conditions in which a first set of logic circuits is to be powered for execution of an instruction to produce correct output, and determine a second set of operating conditions in which a second set of logic circuits is to be powered for execution of the instruction to produce correct output, wherein the second set of logic circuits is to be a proper subset of the first set, and wherein execution of the instruction is to require less power when executed under the second set of operating conditions than when executed under the first set of operating conditions.

Example 13 may include the processor of Example 12, wherein the first set of logic circuits is to include one or more of an adder, a shifter unit, a multiplier, or a two's complement unit.

Example 14 may include the processor of any one of Examples 12 to 13, further including logic, implemented at least partly in fixed-functionality hardware, to examine operands on which the instruction is to operate to determine which of the first and second sets of operating conditions is to prevail.

Example 15 may include the processor of any one of Examples 12 to 14, wherein the logic is to permit an addition of two floating point numbers.

Example 16 may include the processor of any one of Examples 12 to 15, wherein the logic is to permit a multiplication of two floating point numbers.

Example 17 may include the processor of any one of Examples 12 to 16, wherein the logic is to permit a comparison of two floating point numbers.

Example 18 may include the processor of any one of Examples 12 to 17, wherein the logic is to permit an execution of a fused multiply-add instruction.

Example 19 may include the processor of any one of Examples 12 to 18, wherein the logic is to examine operands to determine if one or more of the operands is zero, infinite, denormal, unitary, or not a valid number, and determine which set of operating conditions is to prevail based at least partly on the determination if one or more of the operands is zero, infinite, denormal, unitary, or not a valid number.

Example 20 may include a graphics processing system, comprising at least one shader unit, at least one sampler, and a plurality of execution units, at least one of the execution units including logic, implemented at least partly in fixed-functionality hardware, to determine a first set of operating conditions in which a first set of logic circuits is to be powered for execution of an instruction to produce correct output, and determine a second set of operating conditions in which a second set of logic circuits is to be powered for execution of the instruction to produce correct output, wherein the second set of logic circuits is to be a proper subset of the first set, and wherein execution of the instruction is to require less power when executed under the second set of operating conditions than when executed under the first set of operating conditions.

Example 21 may include the graphics processing system of Example 20, wherein the first set of logic circuits is to include one or more of an adder, a shifter unit, a multiplier, or a two's complement unit.

Example 22 may include the graphics processing system of any one of Examples 20 to 21, further including logic, implemented at least partly in fixed-functionality hardware, to examine operands on which the instruction is to operate to determine which of the first and second sets of operating conditions is to prevail.

Example 23 may include the graphics processing system of any one of Examples 20 to 22, wherein the logic is to permit one or more of an addition of two floating point numbers, a multiplication of two floating point numbers, a comparison of two floating point numbers, or a fused multiply-add of three floating point numbers.

Example 24 may include the graphics processing system of any one of Examples 20 to 23, wherein the logic is to examine operands to determine if one or more of the operands is zero, infinite, denormal, unitary, or not a valid number, and determine which set of operating conditions is to prevail based at least partly on the determination if one or more of the operands is zero, infinite, denormal, unitary, or not a valid number.

Example 25 may include the graphics processing system of any one of Examples 20 to 24, wherein the logic is to compare magnitudes of at least two operands and execute the instruction under the second set of operating conditions if the magnitudes are more than a predetermined amount apart.

Example 26 may include a processor to execute an instruction, comprising means for determining a first set of operating conditions in which a first set of logic circuits is to be powered for execution of an instruction to produce correct output, and means for determining a second set of operating conditions in which a second set of logic circuits is to be powered for execution of the instruction to produce correct output, wherein the second set of logic circuits is to be a proper subset of the first set, and wherein execution of the instruction is to require less power when executed under the second set of operating conditions than when executed under the first set of operating conditions.

Example 27 may include the processor of Example 26, further including means for permitting an addition of two floating point numbers.

Example 28 may include the processor of any of Examples 26 to 27, further including means for permitting a multiplication of two floating point numbers.

Example 29 may include the processor of any of Examples 26 to 28, further including means for permitting a comparison of two floating point numbers.

Example 30 may include the processor of any of Examples 26 to 29, further including means for permitting an execution of a fused multiply-add instruction.

Example 31 may include the processor of any one of Examples 26 to 30, wherein the first set of logic circuits is to include one or more of an adder, a shifter unit, a multiplier, or a two's complement unit.

Example 32 may include the processor of any one of Examples 26 to 31, further including means for examining operands on which the instruction is to operate to determine which of the first and second sets of operating conditions is to prevail.

Example 33 may include the processor of any one of Examples 27 to 32, further including means for examining operands to determine if one or more of the operands is zero, infinite, denormal, unitary, or not a valid number, and means for determining which set of operating conditions is to prevail based at least partly on the determination if one or more of the operands is zero, infinite, denormal, unitary, or not a valid number.

Example 34 may include a method to reduce power use in a processor when executing an instruction, comprising determining a first set of logic circuits that are generally used in execution of the instruction, determining a second set of logic circuits to be used in execution of the instruction in specific cases, wherein the second set is to be smaller than the first set, and examining operands to determine which set of logic circuits is required.

Example 35 may include the method of Example 34, wherein the specific cases involve operands that are equal to zero or one.

Example 36 may include the method of any one of Examples 34 to 35, wherein the specific cases involve determination of magnitudes of the operands.

Example 37 may include the method of any one of Examples 34 to 36, wherein less power is consumed during execution of an instruction carried out using the second set of logic circuits than is consumed by the same instruction when carried out using the first set of logic circuits.

Example 38 may include the method of any one of Examples 34 to 37, wherein the instruction takes at least one floating point number as an operand.

Example 39 may include the method of any one of Examples 34 to 38, wherein the instruction multiplies two numbers.

Example 40 may include the method of any one of Examples 34 to 39, wherein the instruction compares two numbers.

Example 41 may include the method of any one of Examples 34 to 40, wherein the instruction performs a fused multiply-add operation.

Example 42 may include the method of any one of Examples 34 to 41, wherein at least one of the numbers is a floating point number.

Example 43 may include a method to execute an instruction in a processor, comprising determining a first set of operand characteristics in which a first set of logic circuits is to be powered for execution of an instruction to produce correct output, and determining a second set of operand characteristics in which a second set of logic circuits is to be powered for execution of the instruction to produce correct output, wherein the second set of logic circuits is a proper subset of the first set, and wherein execution of the instruction requires less power and/or less energy when executed under the second set of operand characteristics than when executed under the first set of operand characteristics.

Example 44 may include the method of Example 43, wherein the second set of operand characteristics includes one operand being zero or denormal.

Example 45 may include the method of any one of Examples 43 to 44, wherein the second set of operand characteristics includes one operand being infinite.

Example 46 may include the method of any one of Examples 43 to 45, wherein the second set of operand characteristics includes one operand being not a number.

Example 47 may include the method of any one of Examples 43 to 46, wherein the second set of operand characteristics includes there being at least two operands, one of which is at least 24 binary orders of magnitude larger than the other.

Example 48 may include the method any one of Examples 43 to 47, wherein the second set of operand characteristics includes there being at least two operands, one of which is at least 25 binary orders of magnitude larger than the other.

Example 49 may include the method of any one of Examples 43 to 48, wherein there are at least three operands, two of which, when multiplied together, produce a number that is at least 50 binary orders of magnitude larger than the third.

Example 50 may include the method of any one of Examples 43 to 49, wherein there are at least three operands, two of which, when multiplied together, produce a number that is at least 48 binary orders of magnitude larger than the third.

Example 51 may include at least one computer readable storage medium comprising one or more instructions that when executed on a computing device cause the computing device to determine a first set of operating conditions in which a first set of logic circuits is to be powered for execution of an instruction to produce correct output, and determine a second set of operating conditions in which a second set of logic circuits is to be powered for execution of the instruction to produce correct output, wherein the second set of logic circuits is to be a proper subset of the first set, and wherein execution of the instruction is to require less power when executed under the second set of operating conditions than when executed under the first set of operating conditions.

Example 52 may include the at least one computer readable storage medium of Example 51, wherein the instructions, when executed, cause a computing system to implement one or more of an adder, a shifter unit, a multiplier, or a two's complement unit.

Example 53 may include the at least one computer readable storage medium of any one of Examples 51 to 52, wherein the instructions, when executed, cause a computing system to examine operands on which the instruction to produce correct output is to operate to determine which of the first and second sets of operating conditions prevails.

Example 54 may include the at least one computer readable storage medium of any one of Examples 51 to 53, wherein the instruction to produce correct output is to add two floating point numbers.

Example 55 may include the at least one computer readable storage medium of any one of Examples 51 to 54, wherein the instruction to produce correct output is to multiply two floating point numbers.

Example 56 may include the at least one computer readable storage medium of any one of Examples 51 to 55, wherein the instruction to produce correct output is to compare two floating point numbers.

Example 57 may include the at least one computer readable storage medium of any one of Examples 51 to 56, wherein the instructions, when executed, cause a computing system to execute a fused multiply-add instruction.

Example 58 may include the at least one computer readable storage medium of any one of Examples 51 to 57, wherein determination of the second set of operating conditions is to include examining the operands to determine if one or more of the operands is to be zero, infinite, denormal, unitary, or not a valid number.

Example 59 may include the at least one computer readable storage medium of any one of Examples 51 to 58, wherein determination of whether correct output is to be provided upon execution of the instruction is to be determined with reference to a known standard for the instruction.

Example 60 may include the at least one computer readable storage medium of any one of Examples 51 to 59, wherein determination of the second set of operating conditions is to include comparing magnitudes of at least two operands and executing the instruction under the second set of operating conditions if the magnitudes are to be more than a predetermined amount apart.

Example 61 may include the at least one computer readable storage medium of any one of Examples 51 to 60, wherein determination of the second set of operating conditions is to include consideration of rounding conditions.

Techniques and structures described herein may therefore reduce power consumption in graphics processors, and are applicable to other types of processors as well. As a result, graphics processors and other types of processors in which these techniques and structures are used may provide relatively higher energy efficiency.

In some embodiments, the power provided to hardware resources that are not needed to execute a given instruction may not be zero, but may still be less than would ordinarily be used in their operation, which may reduce power consumption.

Various embodiments and various modules may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

While both hardware and software implementations of embodiments are presented herein, a hardware implementation may be utilized to provide power savings by using a reduced number of instructions.

Example sizes/models/values/ranges may have been given, although embodiments are not limited to the same. As manufacturing techniques mature over time, it is expected that devices of smaller size and smaller tactile element size could be manufactured. In addition, well known electrical or fluidic components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method to execute an instruction in a processor, comprising:
   determining, based on an instruction, a first set of operating conditions in which a first set of logic circuits is to be powered for execution of the instruction to produce correct output; and
   determining a second set of operating conditions based on the instruction and on at least one operand in which a second set of logic circuits is to be powered for execution of the instruction to produce correct output, wherein the second set of logic circuits is a proper subset of the first set of logic circuits, and wherein execution of the instruction requires less power when executed under the second set of operating conditions than when executed under the first set of operating conditions;
   wherein determination of the second set of operating conditions includes examining the operands to directly determine if one or more of the operands is denormal and then, if it is not determined to be denormal, directly determining if it is infinite, and wherein if one or more of the operands is directly determined to be infinite or denormal, then the second set of logic circuits is powered and logic circuits belonging to the first set of logic circuits not also belonging to the second set of logic circuits are not powered.

2. The method of claim 1, wherein the first set of logic circuits includes one or more of an adder, a shifter unit, a multiplier, or a two's complement unit.

3. The method of claim 2, further including examining operands on which the instruction operates to determine which of the first and second sets of operating conditions prevails.

4. The method of claim 1, wherein the instruction adds two floating point numbers.

5. The method of claim 1, wherein the instruction multiplies two floating point numbers.

6. The method of claim 1, wherein the instruction compares two floating point numbers.

7. The method of claim 1, wherein the instruction executes a fused multiply-add instruction.

8. The method of claim 1, wherein determination of whether correct output is provided upon execution of the instruction is determined with reference to a known standard for the instruction.

9. The method of claim 1, wherein determination of the second set of operating conditions includes comparing magnitudes of at least two operands and executing the instruction under the second set of operating conditions if the magnitudes are more than a predetermined amount apart.

10. The method of claim 9, wherein determination of the second set of operating conditions includes consideration of rounding conditions.

11. A processor to execute an instruction, comprising:
    logic, implemented at least partly in fixed-functionality hardware, to:
    determine, based on an instruction, a first set of operating conditions in which a first set of logic circuits is to be powered for execution of the instruction to produce correct output;
    determine a second set of operating conditions based on the instruction and on at least one operand in which a second set of logic circuits is to be powered for execution of the instruction to produce correct output, wherein the second set of logic circuits is to be a proper subset of the first set of logic circuits, and wherein execution of the instruction is to require less power when executed under the second set of operating conditions than when executed under the first set of operating conditions;
    examine operands to directly determine if one or more of the operands is denormal and then, if it is not determined to be denormal, directly determining if it is infinite; and
    determine which set of operating conditions is to prevail based at least partly on the direct determination if one or more of the operands is infinite or denormal,
    wherein if one or more of the operands is directly determined to be infinite or denormal, then the second set of logic circuits is to be powered and logic circuits belonging to the first set of logic circuits not also belonging to the second set of logic circuits are not powered.

12. The processor of claim 11, wherein the first set of logic circuits is to include one or more of an adder, a shifter unit, a multiplier, or a two's complement unit.

13. The processor of claim 11, further including logic, implemented at least partly in fixed-functionality hardware, to examine operands on which the instruction is to operate to determine which of the first and second sets of operating conditions is to prevail.

14. The processor of claim 11, wherein the logic is to permit an addition of two floating point numbers.

15. The processor of claim 11, wherein the logic is to permit a multiplication of two floating point numbers.

16. The processor of claim 11, wherein the logic is to permit a comparison of two floating point numbers.

17. The processor of claim 11, wherein the logic is to permit an execution of a fused multiply-add instruction.

18. A graphics processing system, comprising:
    at least one shader unit;
    at least one sampler; and
    a plurality of execution units, at least one of the execution units including logic, implemented at least partly in fixed-functionality hardware, to:
    determine, based on an instruction, a first set of operating conditions in which a first set of logic circuits is to be powered for execution of the instruction to produce correct output;
    determine a second set of operating conditions based on the instruction and on at least one operand in which a second set of logic circuits is to be powered for execution of the instruction to produce correct output, wherein the second set of logic circuits is to be a proper subset of the first set of logic circuits, and wherein execution of the instruction is to require less power when executed under the second set of operating conditions than when executed under the first set of operating conditions;

examine operands to directly determine if one or more of the operands is denormal and then, if it is not determined to be denormal, directly determining if it is infinite; and determine which set of operating conditions is to prevail based at least partly on the direct determination if one or more of the operands is infinite or denormal, wherein if one or more of the operands is directly determined to be infinite or denormal, then the second set of logic circuits is to be powered and logic circuits belonging to the first set of logic circuits not also belonging to the second set of logic circuits are not powered.

19. The graphics processing system of claim 18, wherein the first set of logic circuits is to include one or more of an adder, a shifter unit, a multiplier, or a two's complement unit.

20. The graphics processing system of claim 18, wherein the logic is to permit one or more of an addition of two floating point numbers, a multiplication of two floating point numbers, a comparison of two floating point numbers, or a fused multiply-add of three floating point numbers.

21. The graphics processing system of claim 18, wherein the logic is to compare magnitudes of at least two operands and execute the instruction under the second set of operating conditions if the magnitudes are more than a predetermined amount apart.

* * * * *